(12) United States Patent
Patil et al.

(10) Patent No.: US 12,086,141 B1
(45) Date of Patent: Sep. 10, 2024

(54) COORDINATION OF SERVICES USING PartiQL QUERIES

(71) Applicant: Amazon Technologies, Inc., Seattle, WA (US)

(72) Inventors: Yatin Patil, Redmond, WA (US); Marc Bowes, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 87 days.

(21) Appl. No.: 17/643,790

(22) Filed: Dec. 10, 2021

(51) Int. Cl.
*G06F 16/2455* (2019.01)
*G06F 16/25* (2019.01)

(52) U.S. Cl.
CPC ...... *G06F 16/24553* (2019.01); *G06F 16/258* (2019.01)

(58) Field of Classification Search
CPC ............. G06F 16/24553; G06F 16/258; G06F 16/211; G06F 16/252; G06F 16/254; G06F 16/9024; G06F 16/907
See application file for complete search history.

(56) References Cited

U.S. PATENT DOCUMENTS

| | | | |
|---|---|---|---|
| 6,826,568 | B2 | 11/2004 | Bernstein et al. |
| 6,976,257 | B2 | 12/2005 | Leymann et al. |
| 7,299,294 | B1 | 11/2007 | Bruck et al. |
| 7,577,554 | B2 | 8/2009 | Lystad et al. |
| 7,636,801 | B1 | 12/2009 | Kekre et al. |
| 7,877,511 | B1 | 1/2011 | Berger et al. |
| 8,099,480 | B1 | 1/2012 | Muthusrinivasan et al. |
| 8,145,595 | B2 | 3/2012 | Kloppmann et al. |
| 8,195,693 | B2 | 6/2012 | Syeda-Mahmood |
| 9,003,425 | B2 | 4/2015 | Saha et al. |
| 9,262,228 | B2 | 2/2016 | Bond et al. |
| 9,367,434 | B2 | 6/2016 | Taneja et al. |
| 9,619,788 | B2 | 4/2017 | Helbok et al. |
| 9,690,546 | B2 | 6/2017 | Ben Jemaa et al. |
| 9,886,670 | B2 * | 2/2018 | Dirac ..................... G06N 20/00 |

(Continued)

FOREIGN PATENT DOCUMENTS

WO  WO 2010/149698 A1   12/2010

OTHER PUBLICATIONS

The PartiQL Specification Committee, PartiQL Specification, pp. 1-48. (Year: 2019).*

(Continued)

*Primary Examiner* — Cheyne D Ly
(74) *Attorney, Agent, or Firm* — Knobbe, Martens, Olson & Bear, LLP

(57) ABSTRACT

Systems and methods are described for service coordination using a PartiQL query. For instance, a method may include selecting a recipe from a plurality of recipes in response to a request from a user device, wherein the recipe includes a plurality of operations to provide a complex function, each of the plurality of operations corresponding to a service of a plurality of services; determining a PartiQL query for an operation of the plurality of operations; executing the PartiQL query to obtain a result; transmitting a call to a service of the plurality of services that corresponds to the operation based on the result; receiving a response from the service; and after all operations of the plurality of operations are called, transmitting a response to the request to the user device.

20 Claims, 13 Drawing Sheets

(56) References Cited

U.S. PATENT DOCUMENTS

| | | |
|---|---|---|
| 9,910,697 B2 | 3/2018 | DeArment |
| 10,120,744 B1 | 11/2018 | Mahapatra et al. |
| 10,152,232 B1 | 12/2018 | Kleiner et al. |
| 10,635,789 B1* | 4/2020 | Golden .............. G06F 21/31 |
| 11,343,352 B1* | 5/2022 | Golden .............. H04L 67/60 |
| 11,392,675 B2 | 7/2022 | Golden et al. |
| 11,941,413 B2 | 3/2024 | Theimer et al. |
| 11,948,005 B2 | 4/2024 | Town et al. |
| 2002/0116205 A1 | 8/2002 | Ankireddipally et al. |
| 2002/0156841 A1 | 10/2002 | Landfeldt et al. |
| 2003/0041314 A1 | 2/2003 | Heeren et al. |
| 2003/0084156 A1 | 5/2003 | Graupner et al. |
| 2004/0024787 A1 | 2/2004 | Edwards et al. |
| 2004/0024809 A1 | 2/2004 | Edwards et al. |
| 2004/0230636 A1 | 11/2004 | Masuoka et al. |
| 2005/0005272 A1 | 1/2005 | Moody et al. |
| 2006/0075253 A1 | 4/2006 | Sonkin et al. |
| 2006/0136428 A1 | 6/2006 | Syeda-Mahmood |
| 2007/0008979 A1 | 1/2007 | Keller-Tuberg |
| 2007/0094608 A1 | 4/2007 | Getsch |
| 2007/0223476 A1 | 9/2007 | Fry |
| 2008/0065455 A1 | 3/2008 | Sun et al. |
| 2008/0072195 A1 | 3/2008 | Mukaiyama |
| 2008/0154824 A1 | 6/2008 | Weir et al. |
| 2008/0282262 A1 | 11/2008 | Chrysanthakopoulos |
| 2008/0295076 A1 | 11/2008 | McKain et al. |
| 2009/0063516 A1 | 3/2009 | Wang et al. |
| 2009/0172689 A1 | 7/2009 | Bobak et al. |
| 2009/0177508 A1 | 7/2009 | Leung |
| 2009/0183170 A1 | 7/2009 | Gharpure |
| 2009/0216711 A1 | 8/2009 | Yu et al. |
| 2009/0235252 A1 | 9/2009 | Weber et al. |
| 2010/0217783 A1 | 8/2010 | Farver et al. |
| 2010/0223385 A1 | 9/2010 | Gulley et al. |
| 2010/0223591 A1 | 9/2010 | Shi et al. |
| 2010/0229162 A1 | 9/2010 | Hada et al. |
| 2010/0281359 A1 | 11/2010 | Cao et al. |
| 2010/0313060 A1 | 12/2010 | Björklund et al. |
| 2011/0173294 A1 | 7/2011 | Jackson |
| 2012/0221659 A1 | 8/2012 | Brown et al. |
| 2012/0304243 A1 | 11/2012 | Li et al. |
| 2013/0042258 A1 | 2/2013 | Rector et al. |
| 2013/0138575 A1 | 5/2013 | Zabrovarnyy |
| 2014/0032617 A1 | 1/2014 | Stanfill |
| 2014/0039865 A1 | 2/2014 | Li et al. |
| 2014/0282180 A1 | 9/2014 | Orofino |
| 2014/0324908 A1 | 10/2014 | Graham et al. |
| 2014/0354658 A1 | 12/2014 | Dotsenko et al. |
| 2015/0026343 A1 | 1/2015 | Borges et al. |
| 2015/0156286 A1 | 6/2015 | Blair |
| 2015/0261580 A1 | 9/2015 | Shau et al. |
| 2015/0264119 A1 | 9/2015 | Shau et al. |
| 2015/0264122 A1 | 9/2015 | Shau et al. |
| 2015/0278395 A1 | 10/2015 | Ben Jemaa et al. |
| 2015/0332021 A1 | 11/2015 | Godla |
| 2015/0356301 A1 | 12/2015 | Diehl et al. |
| 2015/0379072 A1 | 12/2015 | Dirac et al. |
| 2016/0070771 A1 | 3/2016 | Vermeulen et al. |
| 2016/0105489 A1 | 4/2016 | Llorca et al. |
| 2016/0210552 A1 | 7/2016 | Kasabov et al. |
| 2016/0315921 A1 | 10/2016 | Dara et al. |
| 2016/0321043 A1 | 11/2016 | Pavln et al. |
| 2017/0046861 A1 | 2/2017 | Beckett et al. |
| 2017/0171102 A1 | 6/2017 | Parker et al. |
| 2017/0214696 A1 | 7/2017 | Cleaver et al. |
| 2017/0249340 A1 | 8/2017 | Okuda et al. |
| 2017/0285981 A1 | 10/2017 | DeArment |
| 2017/0286156 A1 | 10/2017 | Wagner et al. |
| 2017/0323089 A1 | 11/2017 | Duggal et al. |
| 2017/0337380 A1 | 11/2017 | Domke et al. |
| 2017/0346830 A1 | 11/2017 | Goldfarb et al. |
| 2018/0107821 A1 | 4/2018 | Eshkenazi et al. |
| 2018/0139109 A1* | 5/2018 | Zuerner .............. H04L 41/40 |
| 2018/0173526 A1 | 6/2018 | Prinsloo et al. |
| 2018/0204117 A1 | 7/2018 | Brevdo |
| 2018/0205618 A1 | 7/2018 | Weiner et al. |
| 2018/0270165 A1 | 9/2018 | Chen et al. |
| 2018/0284975 A1* | 10/2018 | Carrier .............. G06F 16/9535 |
| 2018/0302277 A1 | 10/2018 | Shimamura et al. |
| 2019/0340033 A1 | 11/2019 | Ganteaume |
| 2020/0257776 A1 | 8/2020 | Golden et al. |

OTHER PUBLICATIONS

Luong et al., DataCalc: Ad-hoc Analyses on Heterogeneous Data Sources, 2019 IEEE International Conference on Big Data, pp. 463-468. (Year: 2019).*

Papakonstantinou et al., AWS Open Source Blog, Announcing PartiQL: One Query language for all your data, pp. 1-11. (Year: 2019).*

Golden et al.. U.S. Appl. No. 15/629,559, filed Jun. 21, 2017, co-owned by applicant.

Anderson, T. E., Dahlin, M. D., Neefe, J.M., Patterson, D. A., Roselli, D.S., & Wang, R. Y. (1996). Serverless network file systems. ACM Transactions on Computer Systems, 14(1), 41-79. doi:http://dx.doi.org/10.1145/225535.225537 (Year: 1996).

Awedh, M. (2006). Proving properties for bounded model checking (Order No. 3219012). Available from ProQuest Dissertations and Theses Professional. (305351876). (Year: 2006).

Berrick, Stephen W., et al. "Giovanni: a web service workflow-based data visualization and analysis system." IEEE Transactions on Geoscience and Remote Sensing 47.1 (2008): 106-113. (Year: 2008).

Hirsch, Benjamin, et al. "A serviceware framework for designing ambient services." Developing Ambient Intelligence. Springer, Paris, 2006. 124-136. (Year: 2006).

Jeff Barr, "Amazon EC2 Container Service (ECS)—Container Management for the AWS Cloud," Amazon.com, Nov. 2014. Retrieved from: https://aws.amazon.com/blogs/aws/cloud-container-management/, in 4 pages.

Jeff Barr, "Amazon API Gateway—Build and Run Scalable Application Backends," Amazon.com, Jul. 2015. Retrieved from: https://aws.amazon.com/blogs/aws/amazon-api-gateway-build-and-run-scalable- application-backends/, in 15 pages.

Jeff Barr, "API Gateway Update—New Features Simplify API Development," Amazon.com, Sep. 2016. Retrieved from: https://aws.amazon.com/blogs/aws/api-gateway-update-new-features-simplify- api-development/, in 10 pages.

Jeff Barr, "AWS Lambda—Run Code in the Cloud," Amazon.com, Nov. 2014. Retrieved from: https://aws.amazon.com/blogs/aws/run-code-cloud/, in 9 pages.

* cited by examiner

COORDINATION OF SERVICES USING PartiQL QUERIES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

DETAILED DESCRIPTION

Figure 1:
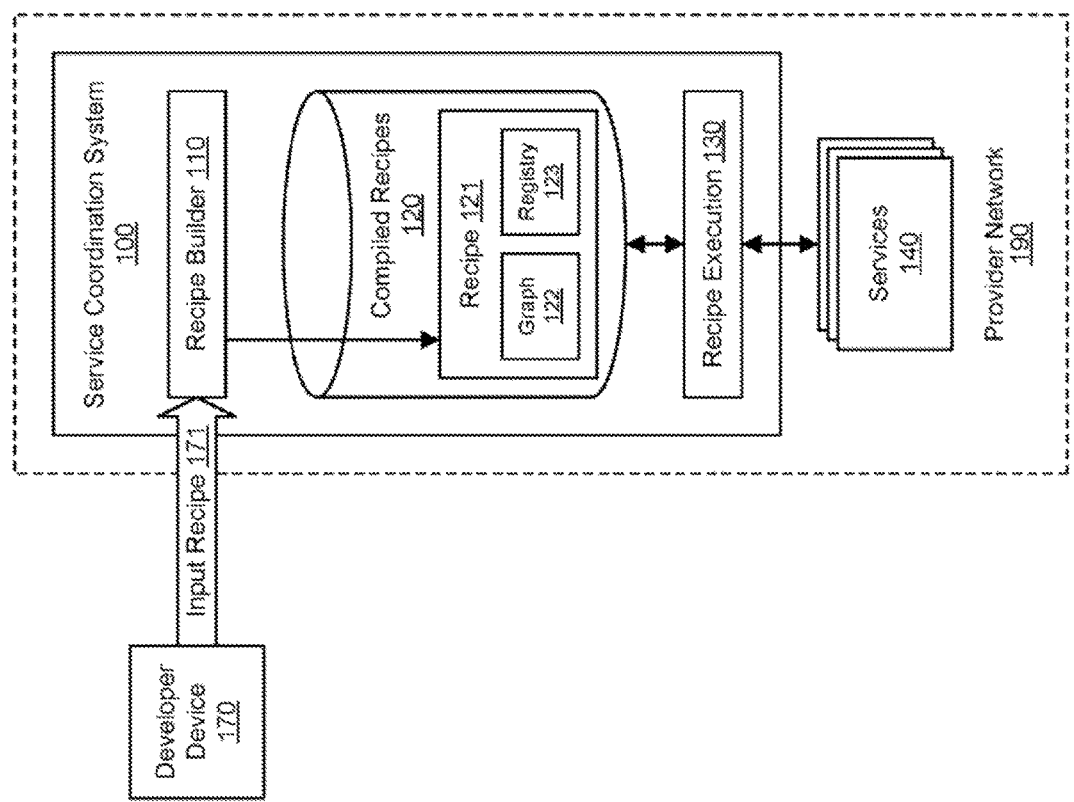
FIG. 1 illustrates an example system environment for coordination of services using recipes, including the use of a recipe builder component, according to aspects of the disclosure.

Generally, aspects of the present disclosure relate to coordination of services and, in a particular example, coordination of services using PartiQL queries. For example, computing systems that loosely couple and implement services to perform tasks may be designed according to a service-oriented architecture (SOA) in which services exchange requests and responses to perform complex operations. A system implemented according to the SOA may be referred to as a service-oriented system. Functionality of the services (e.g., service operations or tasks) may be requested via calls to application programming interfaces (APIs) or other programmatic interfaces. Generally, service coordination systems may use recipes to chain API calls to provide complex functions. However, data formats between the respective API calls may be different, so an embedded data transformation may enable low latency and high reliability service coordination systems. For instance, as discussed in more detail herein, the service coordination system may use user-defined PartiQL query on first data to return second data to effect data transformation. Moreover, in certain embodiments (e.g., with a restricted execution environment adjacent to an environment executing a recipe), the service coordination systems may execute a user-defined query to effect data transformation (e.g., using a query language other than PartiQL) or execute user-defined software code to effect data transformation, or perform other processing tasks (e.g., call routing).

In some prior approaches to maintaining service-oriented systems, a single team or small number of individuals may be tasked with testing and approving new operations or changes to existing operations (e.g., in order to ensure that the operations do not cause errors with existing operations) by managing an interface service (e.g., a service mesh) to connect and interact with a "backend" (e.g., the services). As a service-oriented system grows in size and complexity, those individuals responsible for testing and approval may begin to pose a bottleneck, such that new features may not be added to the service-oriented system without a significant delay. Additionally, using the prior approaches, coordination among services may be implemented in a complex and manual way. As one example, such service-oriented systems may include control logic and other control layers to handle and route requests.

An alternative approach may use a service coordination system, in which developers may rapidly and efficiently add new features to a service-oriented system using recipes. In aspects of the disclosure, new or changed operations may be added to the service-oriented system via a recipe builder component without a requirement for manual approval by another developer or team. Using a recipe execution component, requests for recipe-based operations may often be processed within milliseconds. Therefore, the service coordination system may enable (using the recipes) many operations to be interconnected to provide complex functions. However, the service coordination system may lack routing or the many operations may use data in different formats. For instance, the service coordination system may lack routing as it may not include control logic (to avoid bottlenecking and central management). The many operations may use data in different formats as the various operations may have different respective API schema and underlying processes due to changes over time or different code basis.

Therefore, in some instances, developers may data munge (e.g., transforming data from one format, into use-case-specific format) by creating specialized operations to convert data into correct formats for certain other operations. However, each data munge operation introduces latency. In some cases, the overall latency due to data munging for a recipe may cause an order of magnitude increase in process time (versus a process that does not have to call specialized operations to data munge). Moreover, as developers generate recipes that combine operations from different compute systems (or older compute systems transition to a SOA on the service coordination system or older compute systems that use SOA but were designed with the interface service), the percentage of operations of a recipe that require a data munge operation increases. For instance, in some instances, a percentage of operations of a recipe that require a data munge operation may range from 10% to nearly 100% (e.g., depending on the mix and age of operations). In this case, these recipes may add an additional 10% to nearly 100% increase in operation calls to execute a recipe for a given functionally result. One of skill would recognize that this range is merely illustrative and the particular percentage for a given recipe would depend on the operations included in the recipe. For instance, older API recipes (e.g., those designed with the interface service or before SOA) may have a percentage closer to 100%, while newer APIs (e.g., designed with the service coordination system) may have a percentage closer to 1-10%.

Moreover, in some instances as the service coordination system does not have routing, developers may implement routing on an intermediate layer of the backend (e.g., in between the service coordination system and a particular instance of a service that provides the called operation). The service coordination system may be hosted on a per region basis, so as direct calls to operations within zones within a region. For instance, a developer of a particular service may design and implement routing for the particular service at a zone layer (of many zones) within respective regions of the particular service to direct calls to a specific instance of a service within cells of zones. However, this may introduce reliability issues, as transmitted calls for operations at specific zones may be unresponsive. For instance, zones within a region may be independent (e.g., on separate internet connections, power grids, etc.) but a transmitted call for an operation may be directed to a zone that is currently unresponsive without knowing a different zone is available to handle the operation (e.g., as the routing is performed within the zone that is currently unresponsive). This may be the case, as it is individual zones that become unresponsive and not regions. This may introduce reliability and latency issues (e.g., resending the call for operation until the zone is responsive). Moreover, services may incur higher operational utilization (e.g., processing and memory) to manage routing at a zone layer (e.g., in addition to the compute resources to provide the service itself). Furthermore, developers of services may incur development time and cost to design routing functionality aside from the functionality associated with their respective services.

On the other hand, systems and methods of the present disclosure may enable developers to indicate PartiQL queries within recipes to data munge data formats and/or perform routing, from within the service coordination system. PartiQL queries are data queries that are included in a recipe (e.g., by a developer) to find, select, and return a subset of data from a searched set of data. Generally, the methods and processes of the present disclosure may be accomplished by data queries of query languages that are SQL compatible, by data queries of query languages that are restricted to select-from-where queries, and/or by data queries of query languages that are SQL compatible and capable of executing on structured data, semi-structured, and nested data. While the disclosure is focused on PartiQL queries and the PartiQL language, the concepts discussed herein are applicable to data queries in a data query language or user-defined executable software code (uploaded as a part of a recipe) to transform data structures. For instance, as long as an execution environment of the data query or user-defined executable software code is secure (e.g., sandboxed to separate it from other processing tasks of a recipe), and monitorable (e.g., pre, during, or post processing) to limit resource utilization (e.g., to protect service coordination system), user-defined queries of various data query languages or user-defined executable code (e.g., in certain software languages, such as rust in a WebAssembly) may be executed in a separate execution environment from other portions of the recipe from within the service coordination system. Moreover, PartiQL queries may also be executed in a separate secure execution environment from the other processing tasks of a recipe. A benefit of using PartiQL queries is of increased usability, as users do not need to know a data format before executing a PartiQL query, as the PartiQL engine may handle structured data, semi-structured data, and nested data, using a same search syntax. One skilled in the art will appreciate that the term "query," as used herein, is a broad term encompassing a variety of operations including data transformations. For example, a query may invoke operations to create, read, update, or delete data. Accordingly, use of the term "query" is not, unless explicitly noted, intended to refer to mere retrieval of data Generally, to data munge, a PartiQL query may transform a data format by querying data in a first data format and returning a result in a second data format. In this manner, a recipe using a PartiQL query to data munge may reduce latency by avoiding calling a specialized operation to data munge. Generally, to perform routing, a PartiQL query may select a particular zone, cell, or instance of a service by querying responsiveness data for the service, in accordance with partitioning criteria of the PartiQL query. In this manner, a recipe using a PartiQL query to perform routing may transmit operation calls to a zone, cell, or instance while avoiding unresponsive zones, thereby increasing reliability and reducing latency.

In accordance with embodiments of the present disclosure, to perform routing, a PartiQL query may query the responsiveness data (and/or other data sets, such as cost data for instances in zones or cells) in accordance with dataset criteria of the PartiQL query (referred to as "search dataset"). The PartiQL query may query the search dataset using arbitrary complex search operators and values, in accordance with search criteria of the PartiQL query. For instance, a PartiQL query may indicate the search dataset is the responsiveness data and the cost data; select all available zones, cells, or instances from the responsiveness data; order the available zones, cells, or instances by a cost (indicated by the cost data); and count of N (where N may be 1, 2, or another whole number), thereby returning a result of up to N available zones, cells, or instances, with lowest cost. The result may be stored in a field (e.g., field for a call destination for an operation). Thereafter, as discussed in detail below, a recipe engine may determine a required field (e.g., the call destination field for the operation) of the operation is filled and (if all other required fields are filled), generate and transmit the call API.

In accordance with embodiments of the present disclosure, use PartiQL queries (via a PartiQL engine) to solve data type incompatibility in a recipe without the need to call another service. As PartiQL queries are SQL compatible, the PartiQL queries may act as an adapter layer between service calls. In particular, the service coordination system may be a platform for building control plane APIs with aim to make it easy to write complex functions from micro-service APIs. One of the functionalities of the service coordination system is providing orchestration, thereby making it easy to build customer-facing APIs out of many APIs (e.g., micro-services of services). Developers may do this by writing recipes where multiple APIs can be tied together so one output from one API is input to another API.

For instance, there may often be scenarios where a recipe consists of an external API whose input/output is not compatible with APIs owned by a recipe owner (e.g., different services managed by different teams). This may require the recipe owner to: (1) write an API which can transform the input/output to match the external API, or (2) change their API to be compatible with the specific external API, thus reducing its usability with other APIs. In either case, this may add overhead by maintaining additional APIs. Some examples of transformations may include transforming a single item to list (e.g., customers provide a single ID, but a second API used by the recipe takes in a list of IDs); extracting fields from nested structure (e.g., a list of locations that provide internal to external mapping, but a second API used by the recipe takes a certain mapping in a certain format which is in a different format than the list); a list to a data structure (such as a list of locations into the specific data structure).

By providing developers the capability to perform in place transformations within the recipe (via a PartiQL engine), the service coordination system can relieve customers from owning and managing APIs to do the same data munge operation via an API call. In particular, PartiQL queries may be provided by developers. In some embodiments, the PartiQL queries may be a transformation function, which will be executed by the service coordination system. A benefit of PartiQL queries is that PartiQL queries allows the service coordination system to run SQL-compatible queries on structured data, semi-structured, and nested data, which allows transforming an output structure of API responses into a structure compatible with input of another API of the recipe within service coordination system.

Moreover, the language of PartiQL may restrict developers to only expressing Select-From-Where (SFW) queries. SFW queries may only be executed on the data provided in the query. In this manner, PartiQL query may reduce control logic (e.g., conditionals, if-else statements, etc.) within the service coordination system and thereby avoid bottlenecking. In this manner, the PartiQL queries may also perform routing of calls by selecting call destinations from among destinations provided as data to the query indicating responsive destinations. For instance, the routing may be based on partitioning criteria and responsiveness data.

Furthermore, the language of PartiQL supports exceptions, which may be used to monitor for error conditions. Error conditions may catch malformed or maliciously formed PartiQL queries, or execution errors, thereby ensuring reliability of the service coordination system.

As will be appreciated by one of skill in the art in light of the present disclosure, the embodiments disclosed herein improve the ability of computing systems, such as distributed compute systems, to support many operations in recipes, thereby providing increased reliability and reduced latency. For instance, a recipe may include a PartiQL query to data munge a data format of data to thereby call an operation using a correct data format, without calling a data munge service. Moreover, the presently disclosed embodiments address technical problems inherent within computing systems; specifically, the difficulties in providing service coordination systems for many different services, of various ages, hosted in many zones and cells. For instance, a recipe may include a PartiQL query to data munge a data format of data to thereby call an operation using a correct data format, without calling a data munge service. For instance, a recipe may include a PartiQL query to perform routing for a call of an operation using responsiveness data for a service, in accordance with partitioning criteria of the PartiQL query, thereby avoiding unresponsive zones. These technical problems are addressed by the various technical solutions described herein, including a coordination service configured to provide coordination of services. Thus, the present disclosure represents an improvement on distributed compute systems and computing systems in general.

The foregoing aspects and many of the attendant advantages of this disclosure will become more readily appreciated as the same become better understood by reference to the following description, when taken in conjunction with the accompanying drawings.

Service-Oriented System

Figure 9:
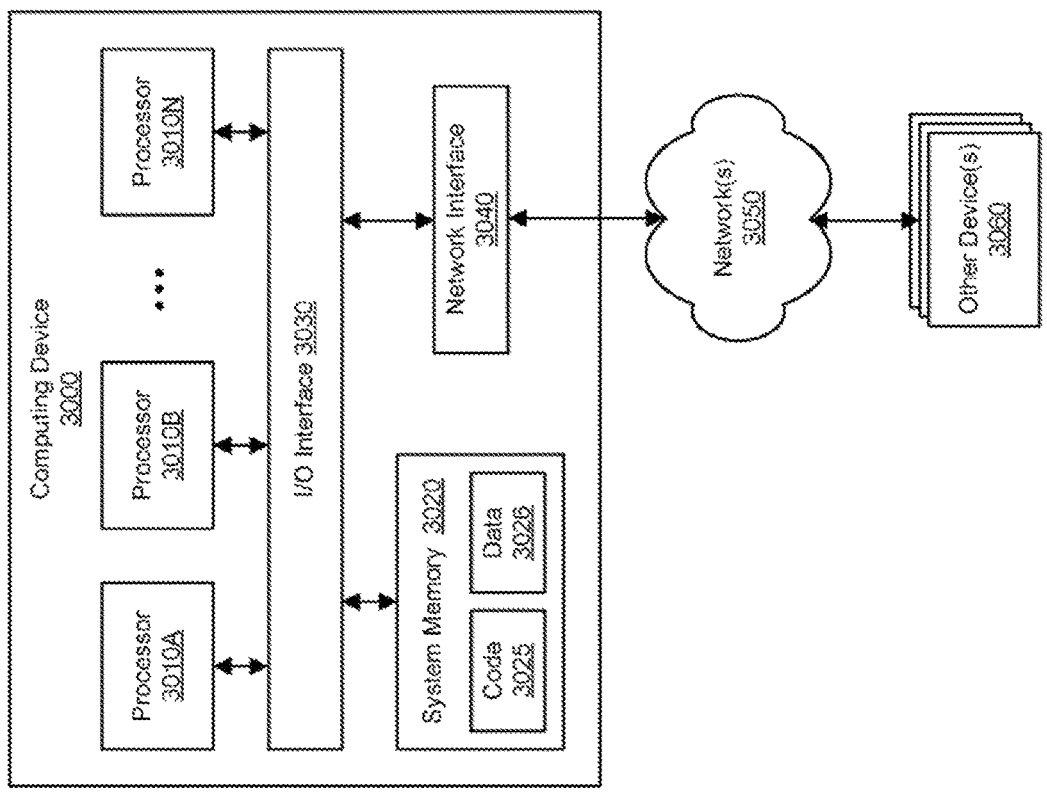
FIG. 9 illustrates an example computing device that may be used in some embodiments.

FIG. 1 illustrates an example system environment for coordination of services using recipes, including use of a recipe builder component, according to one embodiment. A service coordination system 100 may include a recipe builder component 110 for building and maintaining recipes usable to perform collaborative operations in a service-oriented system. The service coordination system 100 may also include a recipe execution component 130 for processing requests for operations based on previously generated recipes. A recipe may comprise a data structure that is usable to perform an operation by invoking other operations. To build a recipe for an operation, a developer 170 may submit an input recipe 171 to the recipe builder 110. The recipe builder 110 may analyze the input recipe 171, compile the input recipe into a compiled recipe 121, and store the compiled recipe in a repository of recipes 120. Using a computing device 170, a developer may enter suitable input using an interface to the recipe builder 110 to provide the input recipe 171. The interface may include a graphical user interface (GUI), command-line interface (CLI), voice-enabled interface, touch-enabled interface, programmatic interface (e.g., an application programming interface), or any other suitable interface. The developer device 170 may be implemented using the example computing device 3000 as shown in FIG. 9.

The input recipe 171 may indicate a set of service operations that the operation is expected to call. For example, if an application programming interface (API) requires tagging, the developer may add a "get tags" or "create tags" operation to the input recipe 171. As another example, if an API requires a volume, the developer may add a "create volume" operation to the input recipe 171. Because the new operation will invoke existing service operations that collaborate to implement a new feature, the new operation may be referred to as a collaborative operation. The input recipe 171 may specify an input model for the operation, e.g., one or more named fields and their data type(s). The input recipe 171 may specify an output model for the operation, e.g., one or more named fields and their data type(s). The input recipe 171 may further specify any manual overrides to bindings of data fields to services, such that the developer specifies which output field from one operation is bound to which input field for another operation. For example, manual overrides may be used when two services use different names for the same data fields. For example, manual bindings may be used to rename fields, change types, or explicitly order operations via shadow fields. Using shadow fields, a false shadow output field may be bound to an operation, and that shadow field may be consumed as an optional input to another, thereby causing the second operation to block until the first operation has executed. Shadow fields may be expressed in the recipe as a binding (e.g., explicit field overrides on inputs and outputs) or as a declarative statement (e.g., a second operation follows a first operation, and the compiler generates the binding).

Using these inputs, the recipe builder 110 (also referred to herein as a compiler) may compile the information in the input recipe 171 into a directed acyclic graph 122 of service operations linked by fields of data, where a field represents the output of one service operation and the input to another. The service operations may be unordered in the input recipe 171, and in generating the compiled recipe 121, the recipe builder 110 may determine an order of the flow of data between the service operations. The recipe builder 110 may analyze the operations in the input recipe to determine the typed inputs and outputs. The recipe builder 110 may then produce the directed acyclic graph of data flow between operations. The recipe builder 110 may implement a set of rules and validations that prevent loops forming in the graph. The recipe builder 110 may also implement a variety of other graph analysis rules to determine if other undesirable conditions are present and may fail the compilation process if so. Additionally, the recipe builder 110 may implement rules to determine best practices and may issue warnings if violations are detected. The graph 122 may be automatically generated based (at least in part) on service definitions (including input and output models for the various service operations) and not necessarily using specific sequences or paths between service operations as specified by the developer. The service operations may be associated with typed input fields (input data fields characterized by data types) and typed output fields (output data fields characterized by data types), and the flow of data may be determined based (at least in part) on correspondences between the typed input fields and the typed output fields of the service operations. For example, the recipe builder 110 may automatically determine that two operations are connected in the graph if one operation produces a particular field (having a particular data type) as an output and another operation consumes that same field (with the same data type) as an input. As used herein, the term "automatically" indicates that a task can be performed to completion by an automated system without additional user input (after some initial configuration stage and/or instruction to begin). The compiled recipe 121 may be used to process requests, e.g., requests from web clients for a customer-facing operation associated with the recipe.

The service operations may represent tasks performed by services 140. The services 140 may be loosely coupled and implemented according to a service-oriented architecture (SOA) in which services exchange requests and responses to perform complex operations. A system implemented according to the SOA may be referred to as a service-oriented system. In one embodiment, the services 140 may include one or more network-accessible services. The network-accessible services may accept requests (e.g., from other services) via a network (e.g., at an Internet-accessible and/or web address) and respond to the requests via the network. Functionality of the services 140 (e.g., service operations) may be requested via calls to application programming interfaces (APIs) or other programmatic interfaces. In various embodiments, the API calls may be performed over a secure proxy connection (e.g., one managed by a gateway control plane into the service and/or provider network), over a publicly accessible network (e.g., the Internet), or over a private channel such as a virtual private network (VPN) connection. The APIs may be implemented according to different technologies, including, but not limited to, Simple Object Access Protocol (SOAP) technology and Representational state transfer (REST) technology. For example, the APIs may be, but are not necessarily, implemented as SOAP APIs or RESTful APIs. SOAP represents a protocol for exchanging information in the context of network-based services. REST represents an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with a network-based data store or other system, service, component, or device.

In some prior approaches to maintaining service-oriented systems, a single team or small number of individuals may be tasked with testing and approving new operations or changes to existing operations (e.g., in order to ensure that the operations do not cause errors with existing operations). As a service-oriented system grows in size and complexity, those individuals responsible for testing and approval may begin to pose a bottleneck, such that new features may not be added to the service-oriented system without a significant delay. Additionally, using the prior approaches, coordination among services may be implemented in a complex and manual way. Using the service coordination system 100, developers may rapidly and efficiently add new features to a service-oriented system using recipes 120. In one embodiment, new or changed operations may be added to the service-oriented system via the recipe builder component 110 without a requirement for manual approval by another developer or team. Using the recipe execution component 130, requests for recipe-based operations may often be processed within milliseconds.

A service operation may be associated with one or more required inputs, optional inputs, and/or one or more optional outputs. Inputs and outputs may be strongly typed. A service operation may be associated with a resource name or other identifier that uniquely identifies the operation within some context (e.g., a service-oriented system). In one embodiment, the combination of inputs, outputs, and resource name may be hashed to indicate a version of the corresponding service operation. A compiled recipe 121 may represent a directed acyclic graph 122 of possible paths through the service operations in the input recipe. In the graph 122, nodes may represent service operations and fields of data.

In one embodiment, a recipe 121 may include a graph 122 and a registry 123. As discussed above, the graph 122 may connect service operations to fields, e.g., to control which services are invoked by the recipe execution component. The registry 123 may include instructions and metadata for invoking service calls, e.g., to control where and how services are invoked. In various embodiments, the registry 123 may store information such as what endpoint to send input data for a service operation, how many connections to open to the endpoint, security parameters (e.g., Secure Sockets Layer information, authorization information, certifications, and so on), whether to do client-side load balancing, how many connections to open per-host for client-side load balancing, the timeout duration, whether to retry and with what strategy, and so on. The identifier for a recipe 121 may be generated as a secure hash of both the graph 122 and the registry 123. In one embodiment, if the service-oriented system includes multiple independent regions (e.g., regions dictated by political and/or geographical boundaries), then the same recipe may have registry information for the different regions.

In one embodiment, the recipe builder component 110 may support changes to recipes 120. Changes submitted by a developer 170 for an existing recipe may include new or different service operations, new or different inputs or outputs, new registry parameters such as service timeouts, and so on. In one embodiment, any such change may result in compilation of a new and immutable recipe. A new recipe may be tested by directing only a limited amount of request traffic to it. In one embodiment, the recipe to be used for a request may be passed via the headers, e.g., with the parameter recipe=RECIPE_ID. In one embodiment, a recipe may be automatically updated when any of its underlying service operations are changed. In one embodiment, the recipe builder 110 may obtain changes to underlying service operations, determine the compiled recipes that are potentially affected, and recompile the recipes to account for the changes in the service operations.

The service coordination system 100 may be implemented using one or more computing devices referred to as instances. Any of the instances may be implemented using the example computing device 3000 as shown in FIG. 9. In various embodiments, portions of the described functionality of the service coordination system 100 may be provided by the same computing device or by any suitable number of different computing devices. If any of the components of the service coordination system 100 are implemented using different computing devices, then the components and their respective computing devices may be communicatively coupled, e.g., via a network. Each of the illustrated components may represent any combination of software and hardware usable to perform their respective functions. It is contemplated that the service coordination system 100 may include additional components not shown, fewer components than shown, or different combinations, configurations, or quantities of the components shown.

Any of the services 140 may be implemented using one or more computing devices, such as the example computing device 3000 illustrated in FIG. 9. The services 140 may be communicatively coupled to the service coordination system 100 via one or more public and/or private networks. In one embodiment, the services 140 and/or service coordination system 100 may convey network-based service requests and responses to each other via the one or more networks. In various embodiments, the network(s) may encompass any suitable combination of networking hardware and protocols necessary to establish network-based communications between the services 140 and the service coordination system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, the services 140 and the service coordination system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between a service and the Internet as well as between the Internet and the service coordination system 100. It is noted that in some embodiments, the services 140 may communicate with the service coordination system 100 using a private network rather than the public Internet.

The service coordination system 100 and/or services 140 may be implemented using resources of a provider network 190. The provider network 190 may include a network set up by an entity such as a business or a public-sector organization to provide one or more services and/or resources (such as various types of network-accessible computing or storage) accessible via the Internet and/or other networks to a distributed set of clients. The provider network 190 may include a plurality of services whose functionality may be invoked on behalf of clients. For example, the provider network 190 may offer one or more computing virtualization services for hosting virtual compute instances or desktops, one or more storage virtualization services for offering various types of storage to clients, and other suitable types of functionality. The various services of the provider network 190 may be integrated via service interfaces. For example, one service may invoke the functionality of another service using a request sent via an application programming interface (API) associated with the called service. The called service may then perform one or more tasks based (at least in part) on the API call and potentially return a response to the calling service. In this manner, services may be chained together in a hierarchy to perform complex tasks. In some embodiments, the services may be configured to generate network-based service requests according to a Representational State Transfer (REST)-style network-based services architecture, a document- or message-based network-based services architecture, or another suitable network-based services architecture. In at least some embodiments, the services may provision, mount, and configure storage volumes implemented at storage services within the provider network. Because one or more of the services may be used by (or invoked on behalf of) a plurality of clients at any given time (using one or more instances of the service), the provider network 190 may offer multi-tenancy and may be referred to as a multi-tenant provider network.

The provider network 190 may include a plurality of resources that are offered to clients. The resources of the provider network 190 may include compute instances, storage instances, and so on. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. The provider network 190 may include additional components not shown, fewer components than shown, or different combinations, configurations, or quantities of the components shown.

The resources offered by the provider network 190 may vary in their respective configurations. The configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, application type and configuration, and so on), and/or other suitable characteristics. For example, the provider network 190 may include a set of compute instances (physical compute instances and/or virtual compute instances) of different compute instance types, where the compute instance types may vary in the capabilities and features of their processor resources, memory resources, storage resources, network resources, and so on, and potentially in their cost to clients as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. In one embodiment, the costs may vary by hardware configuration as well as by purchasing mode. Additionally, the resources offered by the provider network 190 may vary in their availability at particular times.

In some embodiments, an operator of the provider network 190 may implement a flexible set of resource reservation, control, and access interfaces for clients. For example, a resource manager associated with the provider network 190 may implement a programmatic resource reservation interface (e.g., via a web site or a set of web pages) that allows clients and/or internal components to learn about, select, purchase access to, and/or reserve resources (e.g., compute instances) offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2A:
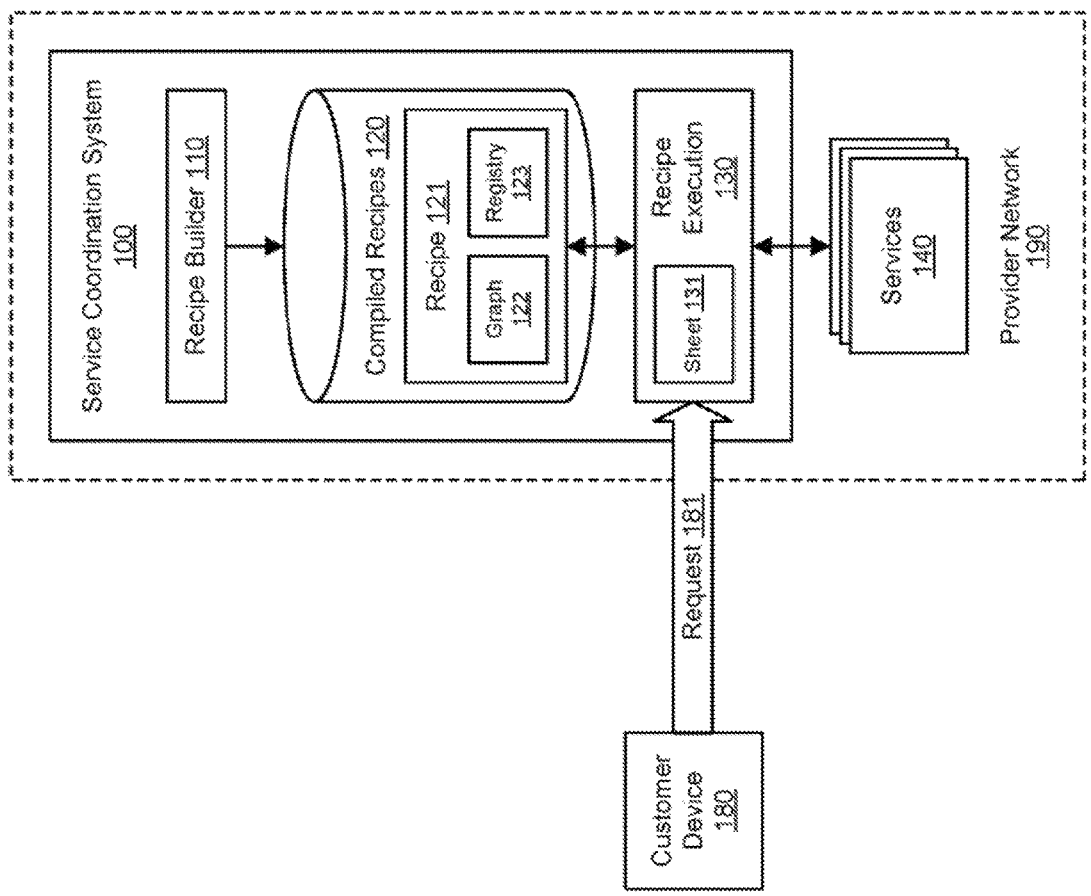
FIG. 2A and FIG. 2B illustrate further aspects of the example system environment for coordination of services using recipes, including the use of a recipe execution component, according to aspects of the disclosure.
Figure 2B:
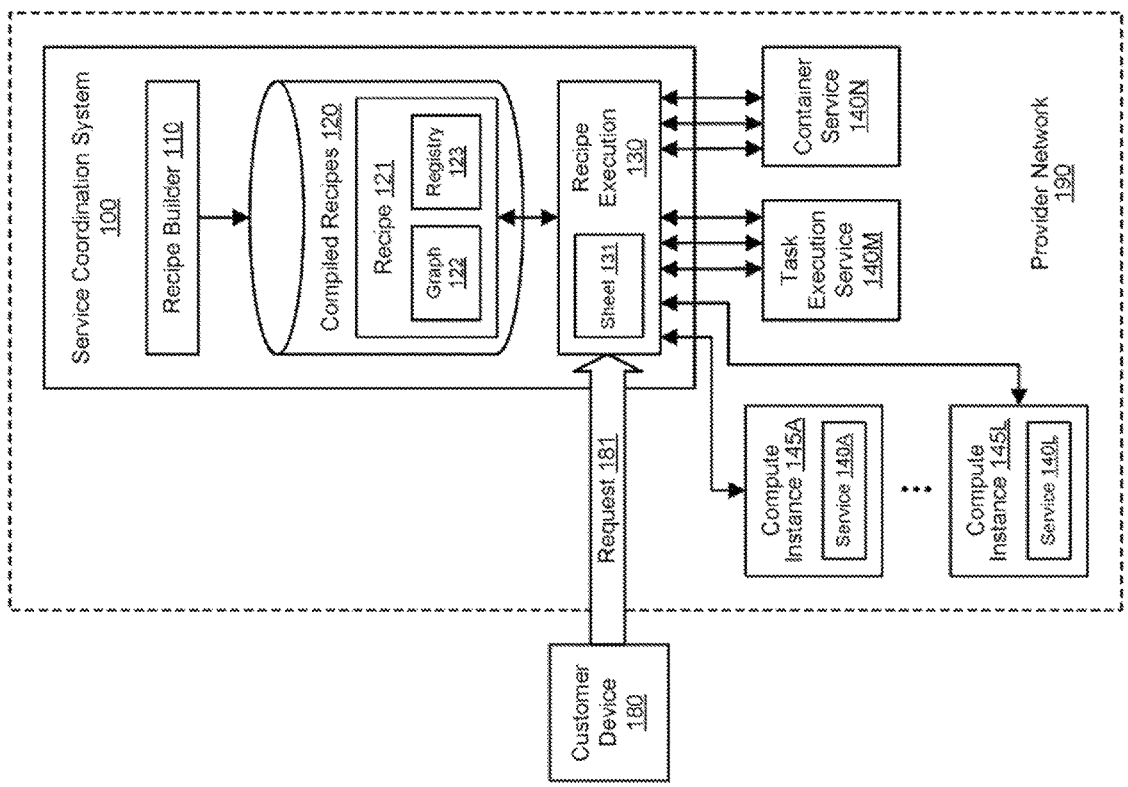

FIG. 2A and FIG. 2B illustrate further aspects of the example system environment for coordination of services using recipes, including the use of a recipe execution component, according to one embodiment. The recipe execution component 130 may also be referred to as a runtime component, and tasks performed by the recipe execution component in the processing of a request 181 may be referred to as taking place at runtime. Using a computing device 180, a customer of the provider network 190 may provide a request 181 for the operation associated with the recipe 121. The operation may be termed a customer-facing operation such that customers of the provider network 190 may request the operation. The customer may represent an internal user of the provider network 190 (including the services 140) or an entity external to the provider network. The customer device 180 may be implemented using the example computing device 3000 as shown in FIG. 9. The request 181 may be provided to the service coordination system 100 via one or more networks, as discussed above with respect to FIG. 1. For example, the request 181 may be received by a component of the provider network 190 in the form of a uniform resource locator (URL) sent by a web browser. The request 181 may be received from the customer 180 and forwarded to the recipe execution component 130 by one or more other components associated with the provider network 190, e.g., one or more web servers, proxies, load balancers, and so on.

In one embodiment, a sheet 131 of data may be used in the processing of a given request 181. In one embodiment, a sheet is a data structure that includes fields of data that can be filled by service operations. The sheet 131 may represent the progress of the request 181. In one embodiment, a sheet may be ephemeral and may be discarded after the processing of the request is complete. The service coordination system 100 may store (temporarily, in memory) the sheet 131 representing the customer's request and its progress, and the service coordination system 100 may allow for annotation of request metadata (e.g., properties, resource identifiers, capacity instructions, placement data, and so on) that independent services may require in order to fulfill their portion of a request. As the request is processed, services may write additional fields to the sheet. The recipe execution component 130 may provide an abstract data access and update API so that called services can modify sheets. In one embodiment, default metadata may be added to a sheet such as encrypted fabric-attached storage, user-agent, credential store properties, source IPs, API version, endpoints, request-id, and so on.

When the request 181 for the operation is received, a compiled recipe 121 associated with the requested operation may be selected, e.g., by the recipe execution component 130. In one embodiment, two or more recipes associated with the same request may be deployed simultaneously, and a selection of one of the recipes may be performed at runtime when a request is received. Different recipes may be linked to different customers, different regions, different compute environments (e.g., a production environment vs. a test environment), and so on. In one embodiment, the recipe 121 may be selected based (at least in part) on the identity of the customer 180. In one embodiment, the recipe 121 may be selected based (at least in part) on one or more traits of the customer 180 and/or request 181, such as the geographical location of the customer. In one embodiment, the recipe 121 may be selected based (at least in part) on a recipe identifier specified with the request 181 (e.g., as a parameter in a uniform resource locator (URL) representing the request), e.g., to override any other basis for selecting the recipe. In one embodiment, the same recipe 121 may be used for all or nearly all requests for the corresponding operation, e.g., unless a different recipe is specified with the request.

The execution order in which service operations in the recipe 121 are invoked may be determined at runtime. A service operation in the graph 122 may be invoked only when its one or more inputs are ready, and so the order in which the graph is traversed may vary from request to request, dependent on the order in which services generate fields of data that are consumed by other services. Service operations may fill fields of data in a sheet, and the sheet may be discarded after the request processing is complete.

In one embodiment, some service calls may be delayed until a predetermined duration of time has passed since another service call was made. The delays may be implemented at runtime. In one embodiment, a delay in a service call may be made to mitigate the chances of doing unnecessary work if another service call fails. In one embodiment, a delay in a service call may be made so that the outputs of two or more service operations are generated closer in time to one another. In one embodiment, metrics concerning service response times may be used to implement the delays. In one embodiment, metrics concerning service failure rates may be used to implement the delays. In many circumstances, services that fail tend to fail rapidly, so service call delays may need only exceed the typical duration of such a failed call in order to prevent unnecessary calls to other services. The metrics used to implement service call delays may be maintained globally in the service coordination system 100 (e.g., using an external repository) or may instead be local to each instance that implements recipe execution 130.

In one embodiment, the recipe execution component 130 may support idempotency such that repeated requests with the same input do not generate different results. To implement idempotency, the recipe execution component 130 may re-drive calls to services until they succeed. If a call fails or no more forward progress is being made, the recipe execution component may mark a sheet as failed (e.g., an error code such as server-unavailable) and respond accordingly to the customer. In one embodiment, the recipe execution component 130 may support rollback of failed requests, e.g., using checkpointing of some fields within a sheet. In one embodiment, a rollback agent may persist rollback documents and then inject those rollback documents as new sheets after some time interval.

As shown in FIG. 2A, the recipe execution component 130 may invoke various services 140 based on traversal of the graph 122 during the processing of the request 181. As shown in FIG. 2B, the services 140 may include various types of services such as services 140A through 140L, service 140M, and service 140N. The various services may be implemented in different ways in the provider network 190. For example, each instance of services 140A through 140L may be implemented using a corresponding compute instance, such as instances 145A through 145L. These instances 145A-145L may represent endpoints that can be contacted by the recipe execution component 130 to invoke operations offered by the resident services. In one embodiment, the services 140A-140L may be accessible via load balancers. The recipe execution may also make one or more calls to a task execution service 140M, such as Amazon Lambda, that offers a "serverless" compute platform in which compute resources are managed internally by the service itself for execution of tasks supplied by clients (including the recipe execution component 130). The task execution service 140M may be used to implement one or more service operations that are invoked by the recipe execution component 130. Additionally, the recipe execution may also make one or more calls to a container service 140N, such as Amazon EC2 Container Service (ECS), that offers API-based launching of containerized applications on a managed cluster of virtual compute instances in the provider network 190. The container service 140N may be used to implement one or more service operations that are invoked by the recipe execution component 130.

In some circumstances, the sheet may be held in memory on a temporary basis and may be discarded shortly after the processing of the request has completed. In other circumstances, the sheet may be transferred to persistent storage for later review and analysis. If the execution of the operation failed, then the sheet (including any fields generated throughout the processing of the corresponding request) may be made available to a suitable developer. The sheet (or portions thereof) may be sent to the developer, or the developer may be granted access to the sheet in a management console associated with the service coordination system 100 or provider network 190. The developer may be associated with the recipe. Using the sheet, the developer may perform debugging or failure analysis of the failed execution. For example, the developer may use the contents of fields in the sheet to ascertain that one or more service calls failed to produce output in the sheet, that the recipe itself was improperly constructed, that the execution was halted by a network failure, and so on. In one embodiment, the developer may modify the recipe based on such analysis.

Figure 3:
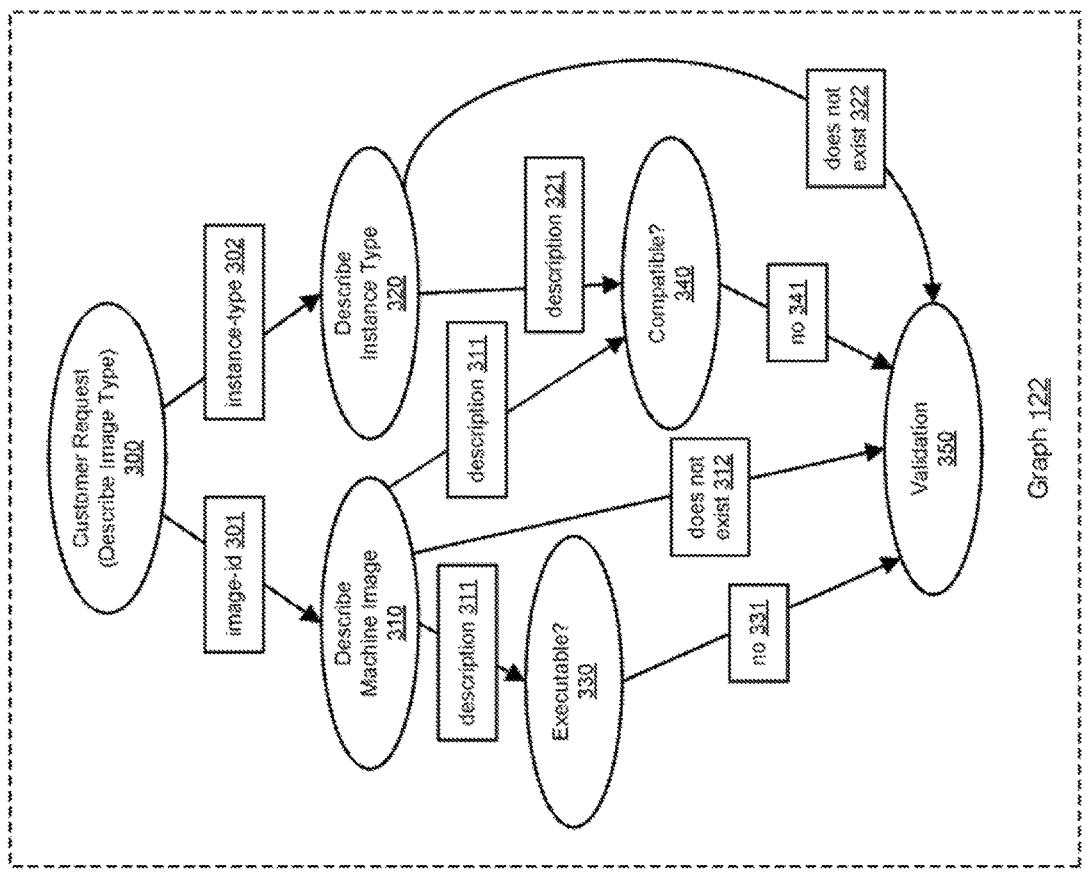
FIG. 3 illustrates an example of a directed acyclic graph usable with the example system environment for coordination of services using recipes, according to aspects of the disclosure.

FIG. 3 illustrates an example of a directed acyclic graph usable with the example system environment for coordination of services using recipes, according to one embodiment. The ovals in the example graph 122 represent nodes that correspond to service operations and data fields. The service operations may be indicated in the input recipe 171, and the flow of data from operation to operation may be determined based (at least in part) on automated analysis of fields. In one embodiment, an order of execution of the service operations may not be indicated in the input recipe 171, and the service operations may be automatically arranged by the recipe builder 110 in the various paths as shown in the graph 122. For example, the recipe builder 110 may automatically determine that two operations are connected in the graph if one operation produces a particular field as an output and another operation consumes that same field as an input. The flow of data in the graph 122 may represent one or more potential execution orders; an actual execution order may be determined for a particular request at runtime. The arrangement of the nodes in the graph 122 may be determined based (at least in part) on analysis of the inputs and outputs of the corresponding service operations. For example, if one service operation produces a particular field and another service operation consumes that field, then the recipe builder 110 may create an edge in the graph between the two operations. The developer 170 may specify manual overrides to such bindings.

The field nodes in the example graph 122 (e.g., fields 301, 302, 311, 312, 321, 322, 331, and 341) may correspond to the fields in a sheet for the request. In the example graph 122, the top-level node 300 may represent an incoming customer request, such as request for an operation to describe an image type. The node 300 may provide the fields image-id 301 and instance-type 302 to other service operations that are invoked by the service coordination system 100. The service operation to describe a machine image may take the image-id field 301 as input. The service operation to describe an instance type may take the instance-type field 302 as input. The describe machine image operation 310 may produce a description field 311 as input to a service operation 330 that determines whether it the machine image is executable. The describe machine image operation 310 may also provide the description field 311 as input to a service operation 340 that determines whether it the machine image is compatible. The describe instance type operation 320 may produce its own description field 321 as input to the service operation 340 that determines whether it is compatible. If the machine image does not exist, the service operation 310 may provide such an indication 312 to a validation operation 350. Similarly, if the instance type does not exist, the service operation 320 may provide such an indication 322 to the validation operation 350. If the machine image is not executable, then the operation 330 may provide such an indication 331 to the validation operation 350. If the machine image or instance type is not compatible, then the operation 330 may provide such an indication 341 to the validation operation 350.

Accordingly, in the example graph 122, the operation 340 may take input fields from two upstream service operations 310 and 320. From request to request, the operations 310 and 320 may vary in terms of how long they take to complete and when they produce their respective output fields. The order in which nodes of the graph 122 are traversed may vary from request to request, and the execution order may be determined at runtime based on the graph itself 122 but also based on the order in which fields become available. For example, in some cases the service operation 330 may be invoked while the service operation 340 remains waiting for the description 321 produced by the service operation 320. In other cases, when the description 321 is ready before the description 311, the service operation 340 may be invoked before or around the same time as the service operation 330. Different paths in the graph 122 may also be traversed in parallel. By traversing the graph 122 based (at least in part) on which inputs are available, the service coordination system 100 may provide both speed and flexibility for orchestrating existing service operations into a collaborative operation.

Figure 4:
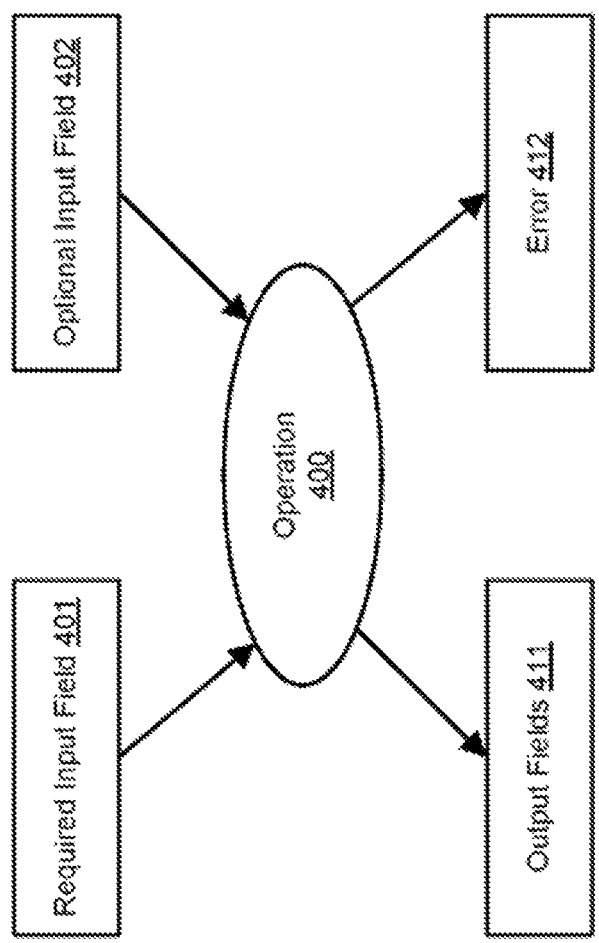
FIG. 4 illustrates an example of an operation flow for coordination of services using recipes, according to aspects of the disclosure.

FIG. 4 illustrates an example of an operation flow for coordination of services using recipes, according to one embodiment. As specified in its recipe, an operation 400 may consume one or more required input fields, such as required input field 401. As specified in its recipe, the operation 400 may consume one or more optional input fields, such as optional input field 402. As further specified in its recipe, the operation 400 may produce one or more output fields, such as output fields 411. The input fields 401 and 402 and output fields 411 may be strongly typed, with data types specified by the developer as part of the recipe. The operation 400 may also be capable of producing an error 412 instead of the output fields 411, e.g., if the outputs 411 cannot be produced due to an error or unavailability of any of the service operations invoked by the operation 400.

Figure 5:
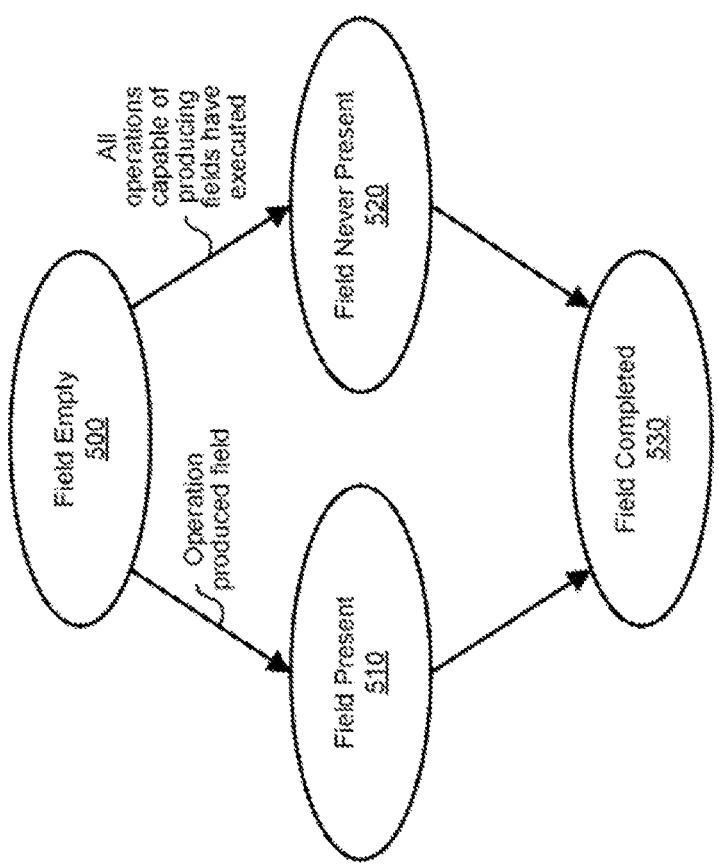
FIG. 5 illustrates an example of field states for coordination of services using recipes, according to aspects of the disclosure.

FIG. 5 is a state diagram illustrating an example of field states for coordination of services using recipes, according to one embodiment. A first state 500 in the state diagram may represent a field being empty. If an operation produced a field, the state diagram may transition to another state 510 in which the field is present. If all operations capable of producing fields have executed, then the state diagram may transition to another state 520 in which a field was never present. From states 510 and 520, the state diagram may transition to another state 530 in which the field has been completed.

Figure 6:
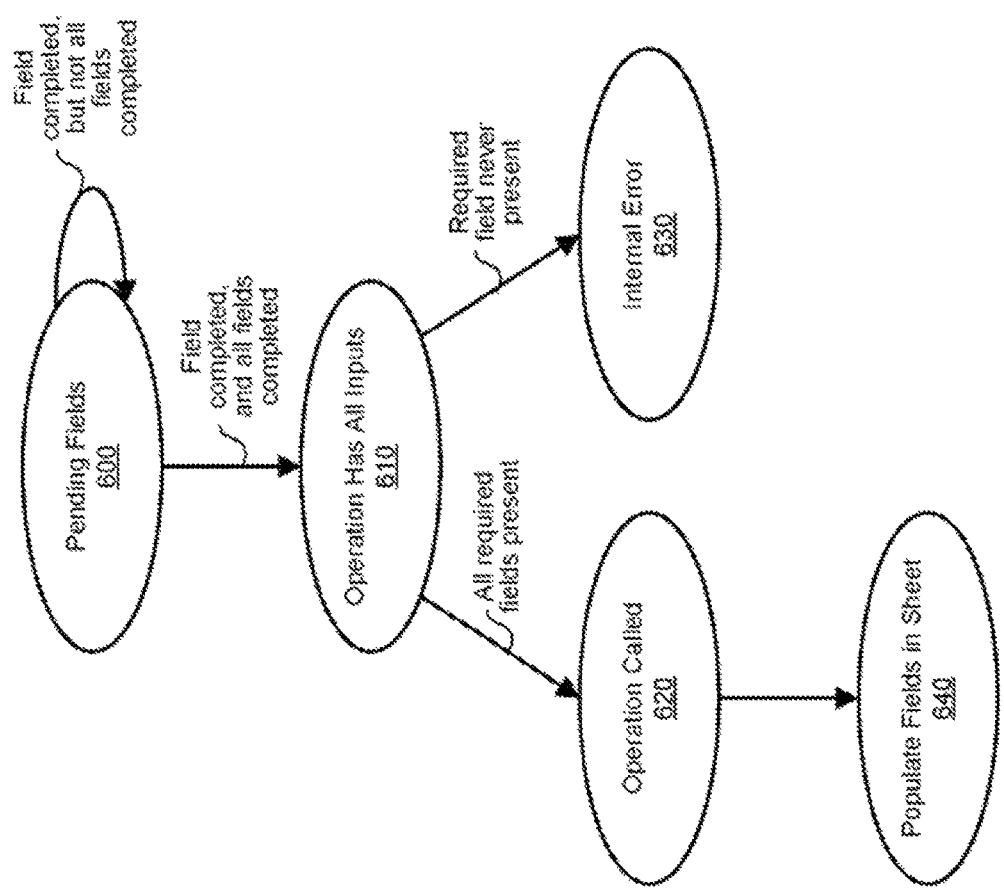
FIG. 6 illustrates an example of operation states for coordination of services using recipes, according to aspects of the disclosure.

FIG. 6 is a state diagram illustrating an example of operation states for coordination of services using recipes, according to one embodiment. In a first state 600, fields of data representing inputs to an operation may be incomplete. When one field is completed but not all of the fields have been completed, the state diagram may remain in the pending fields state 600. When the last field has been completed, the state diagram may transition to another state 610 in which the operation has all inputs (e.g., required inputs and/or optional inputs). If a required field is not present, then the state diagram may transition to a state 630 representing an internal error. If all required fields are present, the state diagram may transition to another state 620 in which the operation has been called (with the inputs). The flow diagram may then transition to a state 640 in which fields in the sheet are populated, e.g., by the service operation that was invoked in the state 620.

Figure 7:
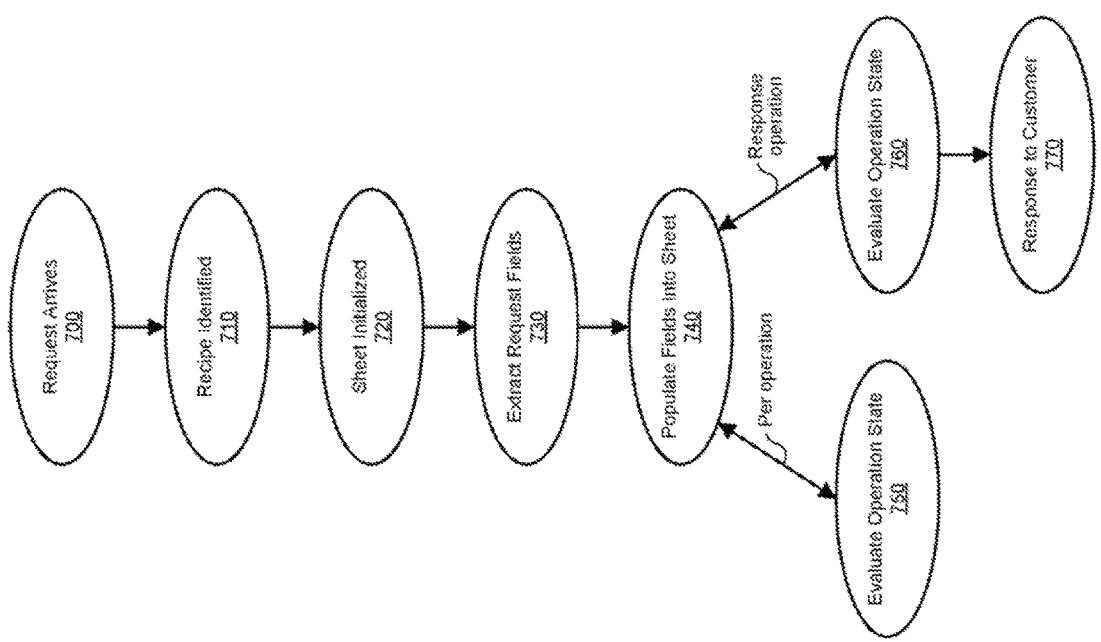
FIG. 7 illustrates an example flow of request processing for coordination of services using recipes, according to aspects of the disclosure.

FIG. 7 is a state diagram illustrating an example of request processing for coordination of services using recipes, according to one embodiment. In a first state 700, a request for an operation arrives. The operation may represent a customer-facing operation and may be received from a customer by the service coordination system 100. In a next state 710, the appropriate recipe for processing the request is identified. In one embodiment, the recipe may be selected based (at least in part) on the identity of the customer. In one embodiment, the recipe may be selected based (at least in part) on one or more traits of the customer and/or request, such as the geographical location of the customer. In one embodiment, the recipe may be selected based (at least in part) on a recipe identifier specified with the request (e.g., as a parameter in a uniform resource locator (URL) representing the request), e.g., to override any other basis for selecting the recipe. In a next state 720, the sheet for the request is initialized. In a next state 730, request fields are extracted. In a next state 740, fields in the sheet are populated. For each operation, the operation state is evaluated as indicated in state 750. For a response operation, the operation state is also evaluated as indicated in state 760. As indicated in state 770, a response is returned to the customer.

Figure 8:
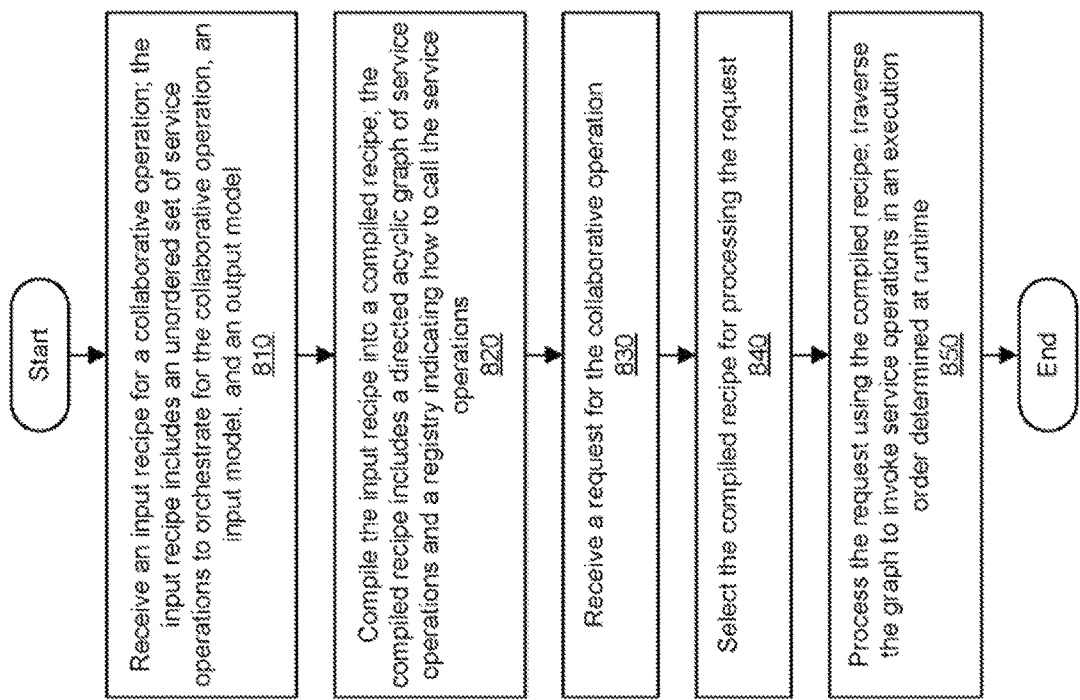
FIG. 8 is a flowchart illustrating a method for coordination of services using recipes, according to aspects of the disclosure.

FIG. 8 is a flowchart illustrating a method for coordination of services using recipes, according to one embodiment. As shown in 810, an input recipe may be received, e.g., at a recipe builder from a developer. The input recipe may describe aspects of a collaborative operation to be performed in a provider network and/or service-oriented system. The input recipe may indicate a set of service operations that the operation is expected to call. The input recipe may specify an input model for the operation, e.g., one or more named fields and their data type(s). The input recipe may specify an output model for the operation, e.g., one or more named fields and their data type(s). The input recipe may further specify any manual overrides to bindings of data fields to services. For example, manual bindings may be used to rename fields, change types, or explicitly order operations via shadow fields. Using shadow fields, a false shadow output field may be bound to an operation, and that shadow field may be consumed as an optional input to another, thereby causing the second operation to block until the first operation has executed. Shadow fields may be expressed in the recipe as a binding (e.g., explicit field overrides on inputs and outputs) or as a declarative statement (e.g., a second operation follows a first operation, and the compiler generates the binding).

As shown in 820, the input recipe may be compiled into a compiled recipe. The compiled recipe may include a directed acyclic graph of service operations linked by fields of data, where a field represents the output of one service operation and the input to another. The service operations may be provided by services that are loosely coupled and implemented according to a service-oriented architecture (SOA) in which services exchange requests and responses to perform complex operations. The service operations may be unordered in the input recipe, and in generating the compiled recipe, the recipe builder may determine an order of the flow of data between the service operations. A service operation may be associated with one or more required inputs, one or more optional inputs, and/or one or more optional outputs. Inputs and outputs may be strongly typed. The compiler may analyze the operations in the input recipe to determine the typed inputs and outputs. The compiler may then produce the directed acyclic graph of data flow between operations. The compiler may implement a set of rules and validations that prevent loops forming in the graph. The compiler may also implement a variety of other graph analysis rules to determine if other undesirable conditions are present and may fail the compilation process if so. Additionally, the compiler may implement rules to determine best practices and may issue warnings if violations are detected. The compiled recipe may also include a registry that stores instructions and metadata for invoking service calls, e.g., to control where and how services are invoked. In various embodiments, the registry may store information such as what endpoint to send input data for a service operation, how many connections to open to the endpoint, security parameters (e.g., Secure Sockets Layer information, authorization information, certifications, and so on), whether to do client-side load balancing, how many connections to open per-host for client-side load balancing, the timeout duration, whether to retry and with what strategy, and so on.

As shown in 830, a request may be received for the collaborative operation. The request may be from a customer for a customer-facing operation. As shown in 840, the compiled recipe may be selected for use in processing the request. In one embodiment, the recipe may be selected based (at least in part) on the identity of the customer. In one embodiment, the recipe may be selected based (at least in part) on one or more traits of the customer and/or request, such as the geographical location of the customer. In one embodiment, the recipe may be selected based (at least in part) on a recipe identifier specified with the request (e.g., as a parameter in a URL representing the request), e.g., to override any other basis for selecting the recipe.

As shown in 850, the request may be processed using the compiled recipe. The graph may be traversed to invoke service operations in an execution order that is determined at runtime. A service operation in the graph may be invoked only when its one or more inputs are ready, and so the order in which the graph is traversed may vary from request to request, dependent on the order in which services generate fields of data that are consumed by other services. Service operations may fill fields of data in a sheet associated with the request, and the sheet may be discarded after the request processing is complete. In one embodiment, some service calls may be delayed until a predetermined duration of time has passed since another service call was made.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Coordination of Services using PartiQL Queries

Figure 10:
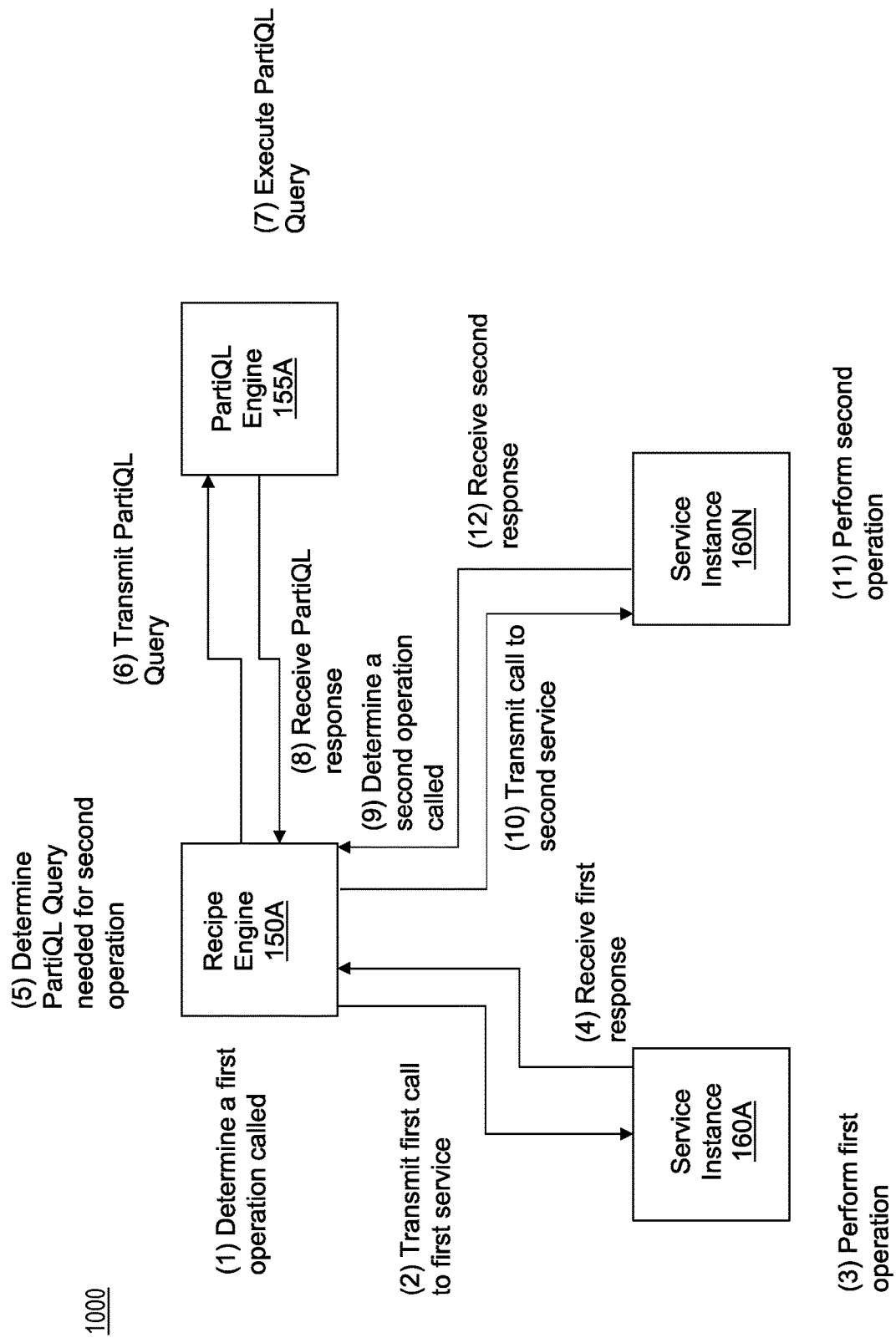
FIG. 10 is an example a flow diagram depicting illustrative interactions for coordination of services using PartiQL queries, according to aspects of the disclosure.

FIG. 10 is an example a flow diagram 1000 depicting illustrative interactions for coordination of services using PartiQL queries, according to aspects of the disclosure. For instance, flow diagram may depict interactions between a recipe engine 150A, a PartiQL engine 155A, a service instance 160A, and a service instance 160N.

The recipe engine 150A and the PartiQL engine 155A may be a part of a recipe execution component 130, as discussed above. One of skill in the art would recognize that the recipe engine 150A and the PartiQL engine 155A may be combined, may be host on a single execution environment (e.g., a virtual machine or container), or may be on separate execution environments of the recipe execution component 130. As discussed below in FIG. 11, there may multiple execution environments in different regions (region 1000A through region 1000N) hosting separate instances of recipe execution component 130 that each have a recipe engine (e.g., recipe engine 150A through 150N) and a PartiQL engine (e.g., PartiQL engine 155A through 155N). For ease of reference, FIG. 10 depicts interactions for region 1000A. Generally, the functionality described below of the recipe engine 150A, the PartiQL engine 155A, the service instance 160A, and the service instance 160N are applicable to the respective components of each region, so the duplicative description thereof is omitted for ease of reference.

The service instances 160A through the service instance 160N may each perform operations in accordance with software code associated therewith. For instance, the service instance 160A through the service instance 160N may each have an API to process calls for particular operations in accordance with the software code and return responses. As discussed above in FIG. 2B, the service instances 160A through 160N may be compute instances for a service (e.g., service 140A), a task execution service 140M, a container service 150N, etc. Generally, any combination of the service instances 160A through the service instance 160N may hosted in various cells in zones, such as zones 1005A through 1005N (e.g., in zone 1000A), and so on for each region. For ease of reference, cells within zones have been omitted.

The recipe engine 150A may perform the method for coordination of services using recipes as discussed in FIG. 8 above. In particular, in relevant part, at 810, an input recipe may be received that indicates a set of service operations that the operation is expected to call and at least one PartiQL query. The at least one PartiQL query may by a data munge PartiQL query, a routing PartiQL query, or a validation PartiQL query. In the case there are two or more PartiQL queries, the PartiQL queries may two or data munge PartiQL queries, two or routing PartiQL queries, or two or validation PartiQL queries, or combinations thereof (e.g., at least one data munge PartiQL query and at least one routing PartiQL query, etc.). Data munge PartiQL queries may rename (e.g., rename a data label from customer ID to name ID), convert (e.g., from a nested data structure to value, or vice versa, etc.), or extract data (e.g., from a nested data structure or table format) (generally referred to as "transform data") from a first data format to a second data format, in accordance with criteria of the data munge PartiQL query, as defined by a developer. Routing PartiQL queries may select a particular zone, cell, or instance of a service by querying responsiveness data for the service, in accordance with partitioning criteria of the routing PartiQL query. A validation PartiQL query may confirm whether data of a field is in an appropriate format to be used by an operation; if so, the operation may be called (if all required fields are populated); and if not, the validation PartiQL may invoke a data munge PartiQL query to transform the data of the field to an appropriate format and the operation may be called (if all required fields are populated). As discussed above, the operations may be an unordered set of operations and the graph may be generated based on fields and data types. In the case of PartiQL queries, the recipe engine 150A may generate the graph to invoke the PartiQL queries using fields and data types on as as-needed basis. The input recipe may further specify any manual overrides to bindings of particular queries between data fields and services. For example, manual bindings may be used to explicitly order operations via shadow fields. Using shadow fields, a false shadow output field may be bound to an PartiQL query, and that shadow field may be consumed as a required input to a particular operation, thereby causing the particular operation to block until the PartiQL query has executed. Shadow fields may be expressed in the recipe as a binding (e.g., explicit field overrides on inputs and outputs of an operation) or as a declarative statement (e.g., the particular operation follows a particular PartiQL query, and the compiler generates the binding). At 820, the input recipe may be compiled into a compiled recipe, including the at least one PartiQL query. The compiled recipe may include a directed acyclic graph of service operations linked by fields of data, where a field represents the output of one service operation and the input to another, with optional (or bound) PartiQL queries therebetween. At 830, a request may be received for the collaborative operation. The request may be from a customer for a customer-facing operation. At 840, the compiled recipe may be selected for use in processing the request. At 850, the request may be processed using the compiled recipe. The graph may be traversed to invoke service operations in an execution order that is determined at runtime. A service operation in the graph may be invoked only when its one or more inputs are ready (e.g., after a PartiQL query has been executed to transform the data, a selected zone, cell or instance has been indicated, or the format has been validated), and so the order in which the graph is traversed may vary from request to request, dependent on the order in which services generate fields of data that are consumed by other services. Service operations may fill fields of data in a sheet associated with the request, and the sheet may be discarded after the request processing is complete. PartiQL queries may fill fields (e.g., replace existing data in fields with transformed data, or fill additional fields associated therewith, such as a selected zone, cell, or instance).

The PartiQL engine 155A may execute PartiQL queries when PartiQL queries are passed/transmitted to the PartiQL engine 155A by the recipe engine 150A. For instance, during run-time, when the recipe engine 150A determines a PartiQL query is needed in order to call an operation, the recipe engine 150A may pass the PartiQL query to the PartiQL engine 155A to thereby execute the PartiQL query. The PartiQL engine 155A may receive the passed PartiQL query; execute the PartiQL query; and pass/transmit a PartiQL response (having a result). For instance, in the case that the PartiQL query is a data munge PartiQL query, the PartiQL engine 155A may obtain data from one or more fields (e.g., in one or more data formats) and transform data (e.g., rename, convert, or extract data) to a second data format, in accordance with the criteria of the data munge PartiQL query. In the case the PartiQL query is a routing PartiQL query, the PartiQL engine 155A may obtain responsiveness data for a service as indicated by a criteria (e.g., ID criteria indicating routing for a particular service or operation) of the routing PartiQL; query the responsiveness data for the service in accordance with the partitioning criteria of the routing PartiQL query, whereby a query result may indicate a selection of a particular zone, cell, or instance of the service to route an operation call. Generally, responsiveness data may indicate which zones are operational (e.g., internet connectivity and/or power, etc.), which cells are operational in the zones (e.g., a server or partition thereof is operational), which instances are operational in cells or zones as some instances may not be in cells (e.g., which services instances are hosted in the cell or zone and operational). Generally, partitioning criteria may load balance calls for operations in known ways (e.g., on load of instances, tenancy of the requestor, cost, etc.) in view of currently operational instances in cells, zones, etc. The PartiQL engine 155A may retrieve the responsiveness data from a monitoring service or determine the responsiveness data based on responses (or lack thereof) from operations that have been called before (e.g., over a period of time). In the case that the PartiQL query is a validation PartiQL query, the PartiQL engine 155A may confirm whether data of one of more fields are an appropriate format to be used by an operation; if so, the operation may be called (if all required fields are populated); and if not, the validation PartiQL may invoke one or more data munge PartiQL queries to transform the data of the one or more field (that are not in an appropriate format) to transform the data to an appropriate format and the operation may be called (if all required fields are populated).

The interactions of flow diagram 1000 of FIG. 10 begin at (1), where the recipe engine may determine a first operation is called. For instance, the recipe engine 150A many determine all required (and optional) fields for the first operation are populated. At (2), the recipe engine 150A may transmit a first call to a first service, such as the service instance 160A. For instance, the recipe engine 150A may generate an appropriate API call based on the data in the required (and optional) fields and transmit the API call to a service endpoint and thereby indirectly to the service instance 160A. At (3), the service instance 160A may execute the first operation based on at least the data included in the API call. The service instance 160A may transmit a first response to the recipe engine 150A. At (4), the recipe engine 150A may receive the first response. The first response may include data to populate a field of the sheet.

At (5), the recipe engine 150A determine a PartiQL query needed a second operation. For instance, in some embodiments, the data may be in a first format different than a format needed for a second operation (e.g., a second format), so the recipe engine 150A may determine a data munge PartiQL query to transform the data. In some embodiments, the data may be in a correct format for the second operation, but the second operation may confirm the format is correct, so the recipe engine 150A may determine a validation PartiQL query to confirm the data format. In some embodiments, the data may be in a correct format for the second operation, but the second operation may need to be routed appropriately, so the recipe engine 150A may determine a routing PartiQL query to determine a zone, cell, or instances to send the call for the operation. In some embodiments, the data may be in the first format different than the format needed for the second operation (e.g., the second format), and the second operation may need to be routed appropriately, so the recipe engine 150A may determine a data munge PartiQL query to transform the data and a routing PartiQL query to determine a zone, cell, or instances to send the call for the operation.

At (6), the recipe engine 150A may transmit the PartiQL query to the PartiQL engine 155A. The PartiQL engine 155A may receive the transmitted PartiQL query. At (7), the PartiQL engine 155A may execute the PartiQL query, as discussed above, such as by retrieving the relevant data from fields or the responsiveness data; and executing the query in accordance with criteria thereof, to obtain a result. The PartiQL engine 155A may then transmit PartiQL response, including the result. At (8), the recipe engine 150A may receive the PartiQL response from the PartiQL engine 155A and update any relevant fields (e.g., replace data in field, fill field, etc.).

At (9), the recipe engine 150A may determine a second operation is called. For instance, the recipe engine 150A many determine all required (and optional) fields for the second operation are populated (including the field updated by the result of the PartiQL engine 155A). At (10), the recipe engine 150A may transmit a second call to a second service, such as the service instance 160N. For instance, the recipe engine 150A may generate an appropriate API call based on the data in the required (and optional) fields and transmit the API call to a service endpoint and thereby indirectly to the service instance 160A. In the case a particular zone, cell or instance has been selected by a routing PartiQL query, the recipe engine 150A may transmit the call directly to the selected zone, cell or instance. At (11), the service instance 160N may execute the second operation based on at least the data included in the API call. The service instance 160N may transmit a second response to the recipe engine 150N. At (12), the recipe engine 150A may receive the second response. The second response may include data to populate a field of the sheet. In this manner, the systems and methods of the present disclosure may increase reliability (by avoiding unresponsive zones) and reduce latency (by avoiding unresponsive zones or not call separate API calls to data munge data formats).

Figure 11:
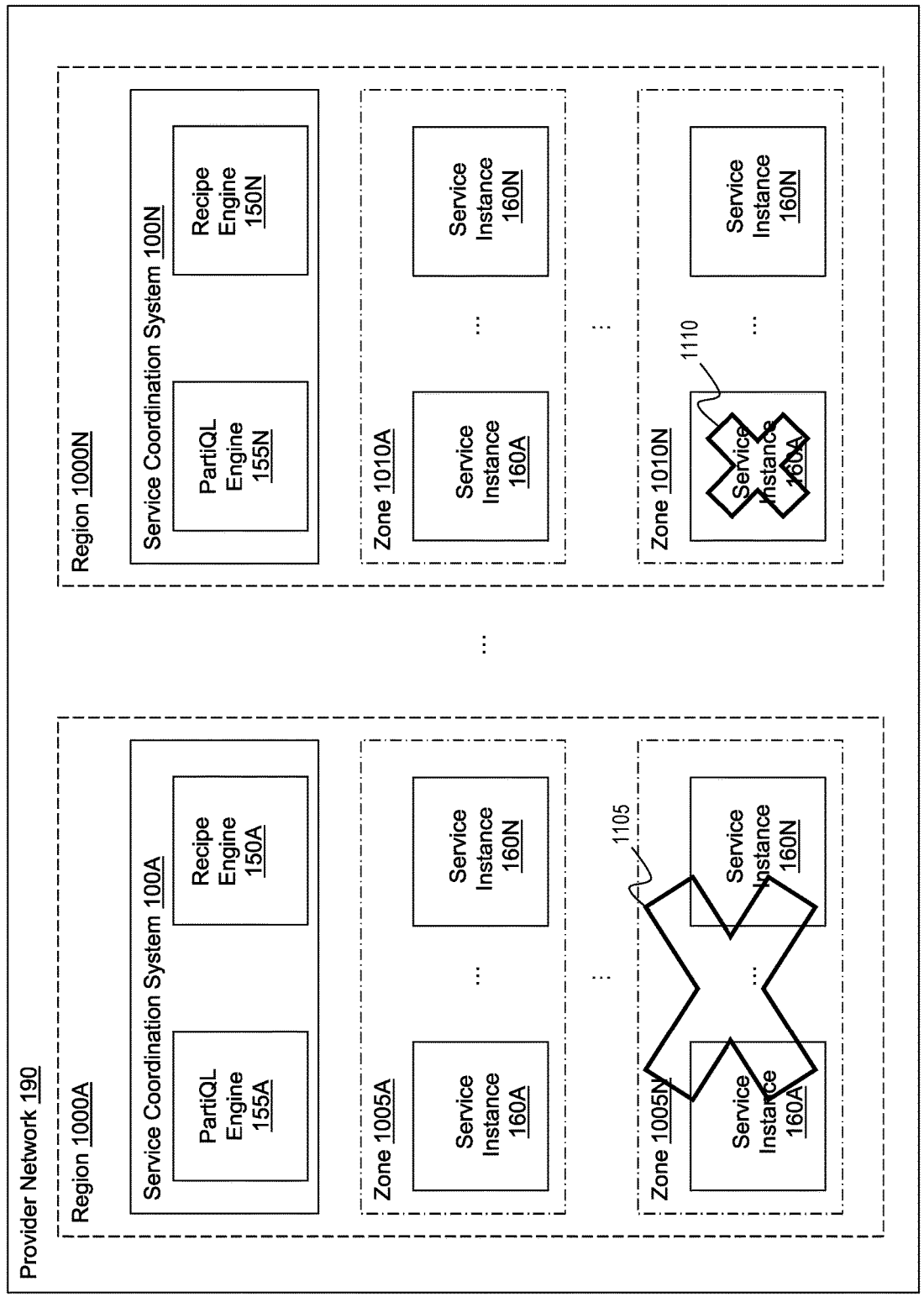
FIG. 11 illustrates an example provider network of FIG. 1 that coordinates services using PartiQL queries, according to aspects of the disclosure.

FIG. 11 illustrates an example provider network 190 of FIG. 1 that coordinates services using PartiQL queries, according to aspects of the disclosure. As mentioned above, the provider network 190 may have different regions (region 1000A through region 1000N) hosting separate instances of recipe execution component 130 that each have a recipe engine (e.g., recipe engine 150A through 150N) and a PartiQL engine (e.g., PartiQL engine 155A through 155N). Moreover, each region may have a plurality of zones such as zones 1005A through 1005N in region 1000A, and zones 1010A through 1010N in region 1000B, etc. In each zone, there may a plurality of cells (not depicted for ease of reference) hosting service instances, such as any combination of the service instances 160A through the service instance 160N. In particular, FIG. 11 may depict responsiveness data indicating particular zones, cells, or instances are not currently responsive. For instance, zone 1005N may be indicated unresponsive in the responsiveness data (see indicator 1105) and service instance 160A in zone 1010N may be indicated unresponsive in the responsiveness data (see indicator 1110). Therefore, if a routing PartiQL query executed on either PartiQL engine 155A or PartiQL engine 155N is executed, the PartiQL engines may know where to route a call for a service instance (e.g., to avoid zone 1005N or service instance 160A in zone 1010N). As mentioned above, the responsiveness data may be retrieved from the monitoring service. Additionally or additionally, PartiQL engines may determine the responsiveness data for zones, cells, or instances, in their respective region, based on responses (or lack thereof) from operations that have been called before (e.g., over a period of time). In this manner, In this manner, the systems and methods of the present disclosure may increase reliability (by avoiding unresponsive zones) and reduce latency (by avoiding unresponsive zones).

Figure 12:
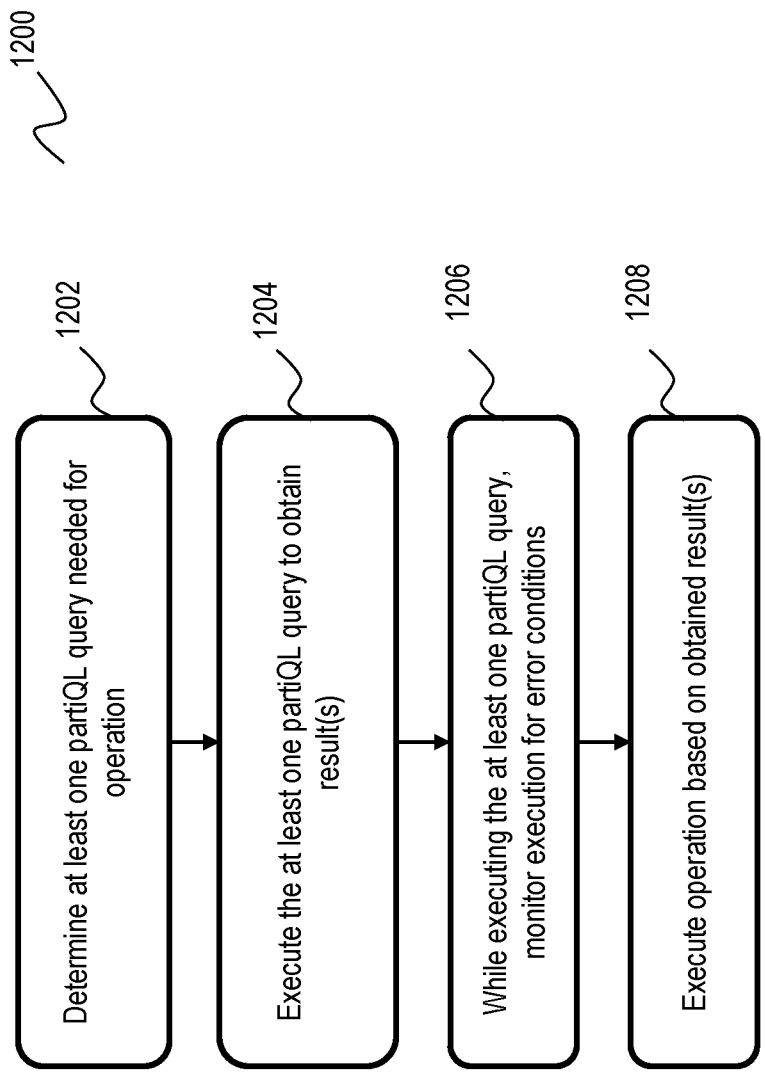
FIG. 12 is a flow chart depicting an illustrative routine for coordination of services using PartiQL queries, according to aspects of the disclosure.

FIG. 12 is flow chart depicting an illustrative routine 1200 for coordination of services using PartiQL queries, according to aspects of the disclosure. The routine 1200 may be implemented, for example, by a recipe execution component 130, including one or more components of FIG. 11, such as one of the recipe engines or PartiQL engines.

The routine 1200 begins at block 1202, where the recipe execution component 130 may determine at least one PartiQL query needed for an operation. For example, a recipe engine may determine one or more data munge data munge PartiQL queries, one or more validation PartiQL queries, and/or one or more routing PartiQL queries are needed for an operation, as discussed above.

At block 1204, the recipe execution component 130 may execute the at least one PartiQL query to obtain result(s). For instance, a recipe engine may pass the at least one PartiQL query to a PartiQL engine. The PartiQL engine may execute each of the at least one PartiQL query to obtain respective results, as discussed above. The PartiQL engine may pass the respective results back to the recipe engine.

At block 1206, the recipe execution component 130 may, while executing the at least one PartiQL query, monitor execution for error conditions. For instance, the PartiQL engine (or the recipe execution component 130 hosting the PartiQL engine) may monitor resource utilization (e.g., memory or CPU utilization, etc.) and/or performance (e.g., throughput rate, current pendency of current query, etc.) of the PartiQL engine, or records in and/or records out of the PartiQL engine (e.g., a quantity of records (e.g., fields of data) or size of data (e.g., bytes)). The error conditions may include one or more thresholds (e.g., upper or lower thresholds) for each of resource utilization, performance, records in, or records out. In response to determining an error condition is satisfied (e.g., value is greater than an upper threshold or a value of less than a lower threshold), the PartiQL engine (or the recipe execution component 130 hosting the PartiQL engine) may determine an error has occurred and the PartiQL query should exit. For instance, the error may be that the execution environment or engine has failed or the PartiQL query was malformed or tampered with by third parties. In this manner, systems and methods of the present disclosure may provide reliability and reduced latency, without risking execution environments of the PartiQL engine (or the recipe execution component 130 hosting the PartiQL engine) and thereby increasing reliability of the service coordination system as a whole. In the case no error condition is satisfied (e.g., no error is detected), the system may proceed. In the case an error condition is satisfied (e.g., an error is detected), the system may exit.

At block 1208, the recipe execution component 130 may execute the operation based on obtained result(s). For instance, a recipe engine many determine all required (and optional) fields for the operation are populated (including the field updated by the result(s) of the at least one PartiQL query. The recipe engine may transmit a call to a service, such as the service instance 160N. For instance, the recipe engine may generate an appropriate API call based on the data in the required (and optional) fields and transmit the API call to a service endpoint and thereby indirectly to the service instance 160N. In the case a particular zone, cell or instance having been selected by a routing PartiQL query, the recipe engine may transmit the call directly to the selected zone, cell or instance. The service instance may execute the operation based on at least the data included in the API call. The service instance may transmit a response to the recipe engine. The recipe engine may receive the response. The response may include data to populate a field of the sheet. In this manner, the systems and methods of the present disclosure may increase reliability (by avoiding unresponsive zones), reduce latency (by avoiding unresponsive zones or not call separate API calls to data munge data formats), and increasing reliability of the service coordination system as a whole (by monitoring for error conditions).

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A service coordination system comprising:
one or more compute instances providing a plurality of computer network-accessible services in accordance with respective application programming interfaces (APIs); and
a recipe execution system configured to store a plurality of recipes, wherein the recipe execution system is configured to:
obtain, from an electronic data store, a recipe from the plurality of recipes in response to a request from a user device, wherein:
the recipe includes a plurality of operations that, when executed, provide fora complex function to be performed by the plurality of computer network-accessible services,
a first operation of the plurality of operations corresponds to a first computer network-accessible service of the plurality of computer network-accessible services, and
a second operation of the plurality of operations corresponds to a second computer network-accessible service of the plurality of computer network-accessible services;
execute the first operation, wherein executing the first operation transmits a first call to a first API of the first computer network-accessible service of the plurality of computer network-accessible services;
receive a first response to the first call from the first API of the first computer network-accessible service, the first response including first data in a first data format;
determine a PartiQL query for connecting the first operation of the plurality of operations to the second operation of the plurality of operations;
execute the second operation based on a result generated from execution of the PartiQL query on the first response, wherein executing the second operation transmits second call to a second API of the second computer network-accessible service of the plurality of computer network-accessible services;
receive a second response to the second call from the second API of the second computer network-accessible service; and
after all operations of the plurality of operations are executed, transmit a response to the request to the user device.

2. The service coordination system of claim 1, wherein, to determine the PartiQL query for connecting the first operation of the plurality of operations to the second operation of the plurality of operations, the recipe execution system is further configured to: determine the PartiQL query for connecting the first operation of the plurality of operations to the second operation of the plurality of operations based on the first data in the first data format.

3. The service coordination system of claim 1, wherein the PartiQL query comprises at least one of a data munge PartiQL, a validation PartiQL query, or a routing PartiQL query.

4. The service coordination system of claim 3, wherein the PartiQL query comprises the data munge PartiQL query when a format needed for the second operation is different than the first data format of the first data in the first response, and the data munge PartiQL query transforms the first data in the first data format to a second data format.

5. The service coordination system of claim 3, wherein the PartiQL query comprises the validation PartiQL query, and the validation PartiQL query confirms the first data format is an appropriate data format.

6. The service coordination system of claim 3, wherein the PartiQL query comprises the routing PartiQL query, and the routing PartiQL query determines at least one of a zone, cell, or instance to send the call for the second operation.

7. A computer-implemented method comprising:
obtaining, from an electronic data store, a recipe from a plurality of recipes in response to a request from a user device, wherein:
the recipe includes a plurality of operations that, when executed, provide fora complex function to be performed by a plurality of computer network-accessible services,
a first operation of the plurality of operations corresponds to a first computer network-accessible service of the plurality of computer network-accessible services, and
a second operation of the plurality of operations corresponds to a second computer network-accessible service of the plurality of computer network-accessible services;
determining a data query for connecting the first operation of the plurality of operations to the second operation of the plurality of operations;

executing the first operation, wherein executing the first operation transmits a call to the first computer network-accessible service of the plurality of computer network-accessible services;

receiving a response to the call from the first computer network-accessible service;

executing the second operation based on a result generated from execution of the data query on the response from the first computer network-accessible service; and after all operations of the plurality of operations are executed, transmitting a response to the request to the user device.

8. The computer-implemented method of claim 7, wherein determining the data query for connecting the first operation of the plurality of operations to the second operation of the plurality of operations is based on first data in a first data format in a field.

9. The computer-implemented method of claim 7, wherein the data query comprises at least one of a data munge query, a validation data query, or a routing data query.

10. The computer-implemented method of claim 9, wherein the data query comprises the data munge data query when a format needed for the second operation is different than a first data format of a first data, and the data munge data query transforms the first data in the first data format to a second data format.

11. The computer-implemented method of claim 9, wherein the data query comprises the validation data query, and the validation data query confirms a first data format of a first data is an appropriate data format.

12. The computer-implemented method of claim 9, wherein the data query comprises the routing data query, and the routing data query determines at least one of a zone, cell, or instance to send the call for the operation.

13. The computer-implemented method of claim 7, wherein executing the second operation based on a result generated from execution of the data query comprises executing the data query in a separate execution environment from an execution environment executing the recipe, and further comprises, while executing the data query in the separate execution environment, monitoring the execution of the data query for error conditions.

14. One or more non-transitory computer-readable media comprising computer-executable instructions that, when executed on a compute system, cause the compute system to:
  obtain, from an electronic data store, a recipe from a plurality of recipes in response to a request from a user device, wherein:
    the recipe includes a plurality of operations that, when executed, provide fora complex function to be performed by a plurality of computer network-accessible services,
    a first operation of the plurality of operations corresponds to a first computer network-accessible service of the plurality of computer network-accessible services, and
    a second operation of the plurality of operations corresponds to a second computer network-accessible service of the plurality of computer network-accessible services;
  determine a data query for connecting the first operation of the plurality of operations to the second operation of the plurality of operations;
  execute the first operation, wherein executing the first operation transmits a call to the first computer network-accessible service of the plurality of computer network-accessible services;
  receive a response to the call from the first computer network-accessible service;
  execute the second operation based on a result generated from execution of the data query on the response from the first computer network-accessible service; and
  after all operations of the plurality of operations are executed, transmit a response to the request to the user device.

15. The one or more non-transitory computer-readable media of claim 14, wherein determining the data query for connecting the first operation of the plurality of operations to the second operation of the plurality of operations is based on first data in a first data format in a field.

16. The one or more non-transitory computer-readable media of claim 14, wherein the data query comprises at least one of a data munge PartiQL, a validation data query, or a routing data query.

17. The one or more non-transitory computer-readable media of claim 16, wherein the data query comprises the data munge data query when a format needed for the second operation is different than a first data format of a first data, and the data munge data query transforms the first data in the first data format to a second data format.

18. The one or more non-transitory computer-readable media of claim 16, wherein the data query comprises the validation data query, and the validation data query confirms a first data format of a first data is an appropriate data format.

19. The one or more non-transitory computer-readable media of claim 16, wherein the data query comprises the routing data query, and the routing data query determines at least one of a zone, cell, or instance to send the call for the operation.

20. The one or more non-transitory computer-readable media of claim 14, wherein to execute the second operation based on a result generated from execution of the data query, the one or more non-transitory computer-readable media comprises further computer-computer executable instructions that, when executed on the compute system, cause the compute system to:
  execute the data query in a separate execution environment from an execution environment executing the recipe, and
  while executing the data query in the separate execution environment, to monitor execution of the data query for error conditions.

* * * * *

UNITED STATES PATENT AND TRADEMARK OFFICE
CERTIFICATE OF CORRECTION

PATENT NO. : 12,086,141 B1  
APPLICATION NO. : 17/643790  
DATED : September 10, 2024  
INVENTOR(S) : Yatin Patil et al.

Page 1 of 1

It is certified that error appears in the above-identified patent and that said Letters Patent is hereby corrected as shown below:

In the Specification

In Column 4, Line 30, delete "data" and insert --data.--.

In Column 20, Line 21, delete "by" and insert --be--.

In the Claims

In Column 25, Claim 1, Line 53, delete "fora" and insert --for a--.

In Column 26, Claim 1, Line 11 (Approx.), after "transmits" insert --a--.

In Column 26, Claim 7, Line 53 (Approx.), delete "fora" and insert --for a--.

In Column 27, Claim 14, Line 51, delete "fora" and insert --for a--.

In Column 28, Claim 20, Line 47 (Approx.), delete "computer-computer" and insert --computer- --.

Signed and Sealed this  
Twenty-first Day of January, 2025

Coke Morgan Stewart  
*Acting Director of the United States Patent and Trademark Office*